(12) United States Patent
Dion et al.

(10) Patent No.: US 11,144,946 B2
(45) Date of Patent: *Oct. 12, 2021

(54) DIGITAL DOWNLOADING JUKEBOX WITH REVENUE-ENHANCING FEATURES

(71) Applicant: TouchTunes Music Corporation, New York, NY (US)

(72) Inventors: Dominique Dion, Verdun Nun's Island (CA); Mounir Khenfir, Dollard-des-Ormeaux (CA); Billy Panagiotopoulos, Lasalle (CA); Christian Pompidor, Montreal (CA); Francois Beaumier, Montreal (CA); Frederic Baril, Montreal (CA); Sebastien Hebert, Montreal (CA)

(73) Assignee: TouchTunes Music Corporation, New York, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/224,123

(22) Filed: Dec. 18, 2018

(65) Prior Publication Data

US 2019/0130430 A1  May 2, 2019

Related U.S. Application Data

(60) Continuation of application No. 14/313,274, filed on Jun. 24, 2014, now Pat. No. 10,169,773, which is a
(Continued)

(51) Int. Cl.
*G06F 17/30* (2006.01)
*G06Q 30/02* (2012.01)
(Continued)

(52) U.S. Cl.
CPC ....... *G06Q 30/0226* (2013.01); *G06F 16/435* (2019.01); *G06F 16/4387* (2019.01);
(Continued)

(58) Field of Classification Search
CPC .. G06Q 30/0207; G06Q 30/0229–0237; G11B 27/002
(Continued)

(56) References Cited

U.S. PATENT DOCUMENTS

| 3,710,137 A | 1/1973 | Stephens, Jr. |
| 3,807,541 A | 4/1974 | Kortenhaus |

(Continued)

FOREIGN PATENT DOCUMENTS

| AU | 199954012 | 4/2000 |
| CA | 2119184 | 9/1994 |

(Continued)

OTHER PUBLICATIONS

Sprague et al. Music Selection using the PartyVote Democratic Jukebox. (May 2008). Retrieved online Aug. 13, 2018. (Year: 2008).*

(Continued)

*Primary Examiner* — James A Reagan
(74) *Attorney, Agent, or Firm* — Nixon & Vanderhye, PC

(57) ABSTRACT

Certain exemplary embodiments described herein relate to digital downloading jukebox systems of the type that typically include a central server and remote jukebox devices that communicate with the central server for royalty accounting and/or content updates. More particularly, certain exemplary embodiments relate to jukebox systems that have revenue-enhancing features such as for example, music recommendation engines and bartender loyalty programs. Such innovative techniques help to both increase per jukebox revenue as well as keep jukebox patrons engaged with the jukebox.

20 Claims, 19 Drawing Sheets

Related U.S. Application Data division of application No. 12/737,395, filed as application No. PCT/US2009/003998 on Jul. 9, 2009, now Pat. No. 8,849,435.

(60) Provisional application No. 61/129,637, filed on Jul. 9, 2008.

(51) Int. Cl.

| | | |
|---|---|---|
| *G07F 17/30* | (2006.01) | |
| *G11B 27/031* | (2006.01) | |
| *G06F 16/635* | (2019.01) | |
| *G06F 16/638* | (2019.01) | |
| *G06F 16/435* | (2019.01) | |
| *G06F 16/68* | (2019.01) | |
| *G06F 16/438* | (2019.01) | |

(52) U.S. Cl.
CPC .......... *G06F 16/635* (2019.01); *G06F 16/638* (2019.01); *G06F 16/639* (2019.01); *G06F 16/68* (2019.01); *G06Q 30/02* (2013.01); *G06Q 30/0232* (2013.01); *G06Q 30/0241* (2013.01); *G06Q 30/0255* (2013.01); *G07F 17/305* (2013.01); *G11B 27/031* (2013.01)

(58) Field of Classification Search
USPC ................. 705/14.1, 14.3–14.37; 369/30.06
See application file for complete search history.

(56) References Cited

U.S. PATENT DOCUMENTS

| | | |
|---|---|---|
| 3,982,620 A | 9/1976 | Kortenhaus |
| 4,008,369 A | 2/1977 | Theurer et al. |
| 4,064,362 A | 12/1977 | Williams |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt et al. |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,696,527 A | 9/1987 | Ding et al. |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,815,868 A | 3/1989 | Speicher |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| D327,687 S | 7/1992 | Arbitor |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| D332,096 S | 12/1992 | Wolff et al. |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |

(56) References Cited

U.S. PATENT DOCUMENTS

| | | |
|---|---|---|
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whistler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A * | 1/1996 | Knowles ............... G07F 17/305 369/30.03 |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,590,318 A | 12/1996 | Zbikowski et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankovitz |
| 5,704,146 A | 1/1998 | Herring et al. |
| 5,708,811 A | 1/1998 | Arendt |
| 5,712,976 A | 1/1998 | Falcon, Jr. et al. |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos et al. |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choquier |
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |

(56) References Cited

U.S. PATENT DOCUMENTS

| | | |
|---|---|---|
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,005 A | 9/1999 | Liu |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A * | 10/1999 | Kaplan ............ G06F 17/30749 |
| | | 705/26.8 |
| 5,966,495 A | 10/1999 | Takahashi |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,026,168 A | 2/2000 | Li et al. |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,067,564 A | 5/2000 | Urakoshi et al. |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,146,210 A | 11/2000 | Cha et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,167,358 A | 12/2000 | Othmer et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,318 B1 * | 9/2001 | Barber ................. G06Q 30/02 |
| | | 705/14.16 |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |
| 6,359,661 B1 | 3/2002 | Nickum |
| 6,370,580 B2 | 4/2002 | Kriegsman |
| 6,379,187 B2 | 4/2002 | Nishimatsu |
| 6,381,575 B1 | 4/2002 | Martin et al. |

(56) References Cited

U.S. PATENT DOCUMENTS

| | | |
|---|---|---|
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,650,747 B1 | 11/2003 | Bala |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| D495,755 S | 9/2004 | Wurz et al. |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,160,132 B2 | 1/2007 | Phillips et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| D560,651 S | 1/2008 | Berkheimer et al. |
| 7,347,723 B1 | 3/2008 | Daily |
| D566,195 S | 4/2008 | Ichimura et al. |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,522,631 B1 | 4/2009 | Brown et al. |
| 7,533,182 B2 | 5/2009 | Wurtzel et al. |
| 7,549,919 B1 | 6/2009 | Nathan et al. |
| 7,574,727 B2 | 8/2009 | Nathan et al. |
| 7,612,433 B2 | 11/2009 | Huang |
| 7,634,228 B2 | 12/2009 | White et al. |
| 7,647,613 B2 | 1/2010 | Drakoulis et al. |
| 7,657,910 B1 | 2/2010 | McAulay et al. |
| 7,668,747 B2 | 2/2010 | Murphy |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,780,529 B2 | 8/2010 | Rowe |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| 7,884,489 B1 | 2/2011 | Stortini |
| 7,922,178 B2 | 4/2011 | Finocchio |
| 7,937,724 B2 | 5/2011 | Clark et al. |
| D642,553 S | 8/2011 | Nathan et al. |
| 7,992,178 B1 | 8/2011 | Nathan et al. |
| 7,993,197 B2 | 8/2011 | Kaminkow |
| 7,996,873 B1 | 8/2011 | Nathan et al. |
| 8,015,200 B2 | 9/2011 | Seiflein et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,103,589 B2 | 1/2012 | Nathan et al. |
| 8,151,304 B2 | 4/2012 | Nathan et al. |
| 8,165,318 B2 | 4/2012 | Nathan et al. |
| 8,214,874 B2 | 7/2012 | Nathan |
| D665,375 S | 8/2012 | Garneau et al. |
| 8,292,712 B2 | 10/2012 | Nathan et al. |
| 8,332,895 B2 | 12/2012 | Nathan et al. |
| 8,429,530 B2 | 4/2013 | Neuman et al. |
| 10,169,773 B2 * | 1/2019 | Dion ............... G06F 16/68 |
| 2001/0016815 A1 | 8/2001 | Takahashi et al. |
| 2001/0023403 A1 * | 9/2001 | Martin ............ G11B 27/36 705/21 |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |

(56) References Cited

U.S. PATENT DOCUMENTS

| | | |
|---|---|---|
| 2002/0018074 A1 | 2/2002 | Buil et al. |
| 2002/0032603 A1 | 3/2002 | Yeiser |
| 2002/0040371 A1 | 4/2002 | Burgess |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0123331 A1 | 9/2002 | Lehaff et al. |
| 2002/0126141 A1 | 9/2002 | Mastronardi |
| 2002/0129036 A1 | 9/2002 | Ho Yuen Lok et al. |
| 2002/0162104 A1 | 10/2002 | Raike et al. |
| 2003/0004833 A1* | 1/2003 | Pollak ............... G06Q 20/12 705/26.1 |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0014272 A1 | 1/2003 | Goulet et al. |
| 2003/0018740 A1 | 1/2003 | Sonoda et al. |
| 2003/0027120 A1 | 2/2003 | Jean |
| 2003/0031096 A1 | 2/2003 | Nathan et al. |
| 2003/0037010 A1 | 2/2003 | Schmelzer |
| 2003/0041093 A1 | 2/2003 | Yamane et al. |
| 2003/0050058 A1 | 3/2003 | Walsh et al. |
| 2003/0064805 A1 | 4/2003 | Wells |
| 2003/0065639 A1 | 4/2003 | Fiennes et al. |
| 2003/0076380 A1 | 4/2003 | Yusef et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0144910 A1* | 7/2003 | Flaherty ............... G06Q 20/18 705/22 |
| 2003/0176218 A1 | 9/2003 | LeMay et al. |
| 2003/0191753 A1 | 10/2003 | Hoch |
| 2003/0200142 A1 | 10/2003 | Hicks |
| 2003/0208586 A1 | 11/2003 | Mastronardi et al. |
| 2003/0212589 A1 | 11/2003 | Kish |
| 2003/0225834 A1 | 12/2003 | Lee et al. |
| 2004/0010800 A1 | 1/2004 | Goci |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter |
| 2004/0158491 A1 | 8/2004 | Ishii |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2004/0243482 A1 | 12/2004 | Laut |
| 2005/0014588 A1* | 1/2005 | Gebrian ............... F16H 7/1272 474/136 |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0209917 A1* | 9/2005 | Anderson ............... G06Q 30/02 705/14.16 |
| 2005/0267819 A1 | 12/2005 | Kaplan |
| 2006/0018208 A1* | 1/2006 | Nathan ............... G11B 27/034 369/30.06 |
| 2006/0031896 A1 | 2/2006 | Pulitzer |
| 2006/0035707 A1 | 2/2006 | Nguyen et al. |
| 2006/0062094 A1* | 3/2006 | Nathan ............... G11B 27/034 369/30.06 |
| 2006/0143575 A1 | 6/2006 | Sauermann |
| 2006/0178193 A1 | 8/2006 | Hunter |
| 2006/0227673 A1 | 10/2006 | Yamashita et al. |
| 2006/0239131 A1 | 10/2006 | Nathan et al. |
| 2006/0293773 A1 | 12/2006 | Nathan et al. |
| 2007/0025701 A1 | 2/2007 | Kawasaki et al. |
| 2007/0038515 A1 | 2/2007 | Postrel |
| 2007/0047198 A1 | 3/2007 | Crooijmans et al. |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna et al. |
| 2007/0145686 A1 | 6/2007 | Wisniewski |
| 2007/0160224 A1 | 7/2007 | Nathan |
| 2007/0174113 A1 | 7/2007 | Rowen |
| 2007/0199014 A1 | 8/2007 | Clark |
| 2007/0204263 A1 | 8/2007 | Nathan et al. |
| 2007/0209053 A1 | 9/2007 | Nathan |
| 2007/0214182 A1 | 9/2007 | Rosenberg |
| 2007/0220052 A1 | 9/2007 | Kudo et al. |
| 2007/0247979 A1* | 10/2007 | Brilion ............... G11B 19/025 369/30.06 |
| 2008/0003881 A1 | 1/2008 | Wu |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0239887 A1 | 10/2008 | Tooker et al. |
| 2008/0275771 A1 | 11/2008 | Levine |
| 2008/0300990 A1 | 12/2008 | Guiton |
| 2008/0305738 A1 | 12/2008 | Khedouri et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0083122 A1* | 3/2009 | Angell ............... G06Q 10/0631 705/7.33 |
| 2009/0091087 A1 | 4/2009 | Wasmund |
| 2009/0100092 A1 | 4/2009 | Seiflein et al. |
| 2009/0138111 A1 | 5/2009 | Mastronardi |
| 2009/0150236 A1* | 6/2009 | Price ............... G06Q 30/02 705/14.13 |
| 2009/0168901 A1 | 7/2009 | Yarmolich et al. |
| 2009/0172565 A1 | 7/2009 | Jackson et al. |
| 2009/0177301 A1 | 7/2009 | Hayes |
| 2009/0240721 A1 | 9/2009 | Giacalone |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0298577 A1 | 12/2009 | Gagner et al. |
| 2009/0307314 A1 | 12/2009 | Smith et al. |
| 2009/0328095 A1 | 12/2009 | Vinokurov et al. |
| 2010/0042505 A1 | 2/2010 | Straus |
| 2010/0131558 A1 | 5/2010 | Logan et al. |
| 2010/0211818 A1 | 8/2010 | Nathan et al. |
| 2010/0241259 A1 | 9/2010 | Nathan |
| 2010/0247081 A1 | 9/2010 | Victoria Pons |
| 2010/0269066 A1 | 10/2010 | Nathan |
| 2010/0299232 A1 | 11/2010 | Nathan et al. |
| 2010/0306179 A1 | 12/2010 | Lim |
| 2011/0055019 A1 | 3/2011 | Coleman |
| 2011/0066943 A1 | 3/2011 | Brillon et al. |
| 2011/0173521 A1 | 7/2011 | Horton et al. |
| 2011/0246517 A1 | 10/2011 | Nathan et al. |
| 2011/0270894 A1 | 11/2011 | Mastronardi et al. |
| 2011/0283236 A1 | 11/2011 | Beaumier et al. |
| 2011/0298938 A1 | 12/2011 | Nathan et al. |
| 2011/0304685 A1 | 12/2011 | Khedouri et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |

(56) References Cited

U.S. PATENT DOCUMENTS

| | | |
|---|---|---|
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2012/0323652 A1 | 12/2012 | Mastronardi et al. |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |
| 2013/0091054 A1 | 4/2013 | Nathan et al. |
| 2014/0026154 A1 | 1/2014 | Nathan |
| 2014/0310085 A1* | 10/2014 | Dion .................. G06F 16/639 705/14.27 |

FOREIGN PATENT DOCUMENTS

| | | | | |
|---|---|---|---|---|
| CN | 1340939 | 3/2002 | | |
| DE | 3406058 | 8/1985 | | |
| DE | 3723737 | 1/1988 | | |
| DE | 3820835 | 1/1989 | | |
| DE | 3815071 | 11/1989 | | |
| DE | 4244198 | 6/1994 | | |
| DE | 19539172 | 9/1996 | | |
| DE | 19610739 | 9/1997 | | |
| DE | 19904007 | 8/2000 | | |
| EP | 0082077 | 6/1983 | | |
| EP | 0140593 | 5/1985 | | |
| EP | 0256921 | 2/1988 | | |
| EP | 0283304 | 9/1988 | | |
| EP | 0283350 | 9/1988 | | |
| EP | 0309298 | 3/1989 | | |
| EP | 0313359 | 4/1989 | | |
| EP | 0340787 | 11/1989 | | |
| EP | 0363186 | 4/1990 | | |
| EP | 0425168 | 5/1991 | | |
| EP | 0464562 | 1/1992 | | |
| EP | 0480558 | 4/1992 | | |
| EP | 0498130 | 8/1992 | | |
| EP | 0507110 | 10/1992 | | |
| EP | 0529834 | 3/1993 | | |
| EP | 0538319 | 4/1993 | | |
| EP | 0631283 | 12/1994 | | |
| EP | 0632371 | 1/1995 | | |
| EP | 0711076 | 5/1996 | | |
| EP | 0786122 | 7/1997 | | |
| EP | 0817103 | 1/1998 | | |
| EP | 0841616 | 5/1998 | | |
| EP | 0919964 | 6/1999 | | |
| EP | 0959570 | 11/1999 | | |
| EP | 0974896 | 1/2000 | | |
| EP | 0974941 | 1/2000 | | |
| EP | 0982695 | 3/2000 | | |
| EP | 1001391 | 5/2000 | | |
| EP | 1170951 | 1/2002 | | |
| EP | 1288802 | 3/2003 | | |
| EP | 1408427 | 4/2004 | | |
| EP | 1549919 | 4/2004 | | |
| EP | 1962251 | 8/2008 | | |
| FR | 2602352 | 2/1988 | | |
| FR | 2808906 | 11/2001 | | |
| GB | 2122799 | 1/1984 | | |
| GB | 2166328 | 4/1986 | | |
| GB | 2170943 | 8/1986 | | |
| GB | 2193420 | 2/1988 | | |
| GB | 2238680 | 6/1991 | | |
| GB | 2254469 | 10/1992 | | |
| GB | 2259398 | 3/1993 | | |
| GB | 2262170 | 6/1993 | | |
| GB | 2380377 | 4/2003 | | |
| GB | 2505584 | 8/2014 | | |
| JP | 57173207 | 10/1982 | | |
| JP | 58-179892 | 10/1983 | | |
| JP | 60-253082 | 12/1985 | | |
| JP | 61084143 | 4/1986 | | |
| JP | 62-192849 | 8/1987 | | |
| JP | 62-284496 | 12/1987 | | |
| JP | 63-60634 | 3/1988 | | |
| JP | 2-153665 | 6/1990 | | |
| JP | 5-74078 | 3/1993 | | |
| JP | 5122282 | 5/1993 | | |
| JP | 06-127885 | 5/1994 | | |
| JP | 07281682 | 10/1995 | | |
| JP | 07-311587 | 11/1995 | | |
| JP | 08-037701 | 2/1996 | | |
| JP | 8274812 | 10/1996 | | |
| JP | 08279235 | 10/1996 | | |
| JP | 08289976 | 11/1996 | | |
| JP | 928918 | 2/1997 | | |
| JP | 9114470 | 5/1997 | | |
| JP | 9127964 | 5/1997 | | |
| JP | 09-244900 | 9/1997 | | |
| JP | 10-098344 | 4/1998 | | |
| JP | 10-222537 | 8/1998 | | |
| JP | 11-003088 | 1/1999 | | |
| JP | 11-024686 | 1/1999 | | |
| JP | 11-095768 | 4/1999 | | |
| JP | 2002-83640 | 3/2002 | | |
| JP | 2002-537584 | 11/2002 | | |
| JP | 2003-076380 | 3/2003 | | |
| JP | 2003-084903 | 3/2003 | | |
| JP | 2003-099072 | 4/2003 | | |
| JP | 2005-107267 | 4/2005 | | |
| JP | 2005-184237 | 7/2005 | | |
| JP | 2006-048076 | 2/2006 | | |
| JP | 2007-034253 | 2/2007 | | |
| JP | 2007-041722 | 2/2007 | | |
| JP | 2007034253 A * | 2/2007 | .......... | G11B 27/034 |
| JP | 2007/505410 | 3/2007 | | |
| JP | 07504517 | 3/2007 | | |
| JP | 2007-102982 | 4/2007 | | |
| JP | 2007-104072 | 4/2007 | | |
| JP | 2007-128609 | 5/2007 | | |
| JP | 2007-164078 | 6/2007 | | |
| JP | 2007-164298 | 6/2007 | | |
| JP | 2007/179333 | 7/2007 | | |
| JP | 2007-241748 | 9/2007 | | |
| JP | 2008-058656 | 3/2008 | | |
| JP | 2009-017529 | 1/2009 | | |
| JP | 2009-075540 | 4/2009 | | |
| TW | 514511 | 12/2002 | | |
| TW | M274284 | 9/2005 | | |
| TW | M290206 | 5/2006 | | |
| WO | WO 86/01326 | 2/1986 | | |
| WO | WO 90/00429 | 1/1990 | | |
| WO | WO 90/07843 | 7/1990 | | |
| WO | WO 91/08542 | 6/1991 | | |
| WO | WO 91/20082 | 12/1991 | | |
| WO | WO 93/16557 | 8/1993 | | |
| WO | WO 93/18465 | 9/1993 | | |
| WO | WO 93/021732 | 10/1993 | | |
| WO | WO93/021732 | 10/1993 | | |
| WO | WO 94/03894 | 2/1994 | | |
| WO | WO 94/14273 | 6/1994 | | |
| WO | WO 94/15306 | 7/1994 | | |
| WO | WO 94/15416 | 7/1994 | | |
| WO | WO 95/03609 | 2/1995 | | |
| WO | WO 95/29537 | 11/1995 | | |
| WO | WO 96/12255 | 4/1996 | | |
| WO | WO 96/12256 | 4/1996 | | |
| WO | WO 96/12257 | 4/1996 | | |
| WO | WO 96/12258 | 4/1996 | | |
| WO | WO 98/07940 | 2/1998 | | |
| WO | WO 98/11487 | 3/1998 | | |
| WO | WO 98/45835 | 10/1998 | | |
| WO | WO 99/35753 | 7/1999 | | |
| WO | WO 01/00290 | 1/2001 | | |
| WO | WO 01/08148 | 2/2001 | | |
| WO | WO 01/71608 | 9/2001 | | |
| WO | WO 02/060546 | 8/2002 | | |
| WO | WO 02/095752 | 11/2002 | | |
| WO | WO 01/084353 | 1/2003 | | |
| WO | WO 2003/005743 | 1/2003 | | |
| WO | WO 03/069613 | 8/2003 | | |

(56) References Cited

FOREIGN PATENT DOCUMENTS

| WO | WO 2004019257 A1 | 3/2004 | |
| --- | --- | --- | --- |
| WO | WO-2004019257 A1 * | 3/2004 | ............. G06Q 30/02 |
| WO | WO 2004/029775 | 4/2004 | |
| WO | WO-2004029775 A2 * | 4/2004 | ........... G11B 27/002 |
| WO | WO 2005/026916 | 3/2005 | |
| WO | WO 2006/014739 | 2/2006 | |
| WO | WO 2006/056933 | 6/2006 | |
| WO | WO 2006/138064 | 12/2006 | |
| WO | WO 2007/092542 | 8/2007 | |
| WO | WO 2008-033853 | 3/2008 | |
| WO | WO 2011094330 | 8/2011 | |
| WO | WO 2013/040603 | 3/2013 | |

OTHER PUBLICATIONS

Sprague et al. Music Selection using the PartyVote Democratic Jukebox. (May 2008). Retrieved online Aug. 13, 2018. ttps://www.researchgate.net/publication/220944867_Music_selection_using_the_PartyVote_democratic_jukebox (Year: 2008).*
• Sprague et al. Music Selection using the PartyVote Democratic Jukebox. (May 2008). Retrieved online Aug. 13, 2018. https://www.researchgate.net/publication/220944867_Music_selection_using_the_PartyVote_democratic_jukebox (Year: 2008).*
International Search Report for PCT/US2009/003998, dated Aug. 17, 2009.
Merriam Webster's Collegiate Dictionary, Ninth Edition, Merriam Webster, Inc., p. 1148, 1986 (definition of "Stand").
Merriam-Webster, Incorporated, Merriam-Webster's Collegiate Dictionary, $10^{th}$ Ed (1998) at p. 380.
"About Ecast", date unknown, leaflet.
Ahanger et al.; A Digital On-Demand Video Service Supporting Content-Based Queries; 1993; 9 pages.
Austin Cyber Limits: Name That Tune [online], [retrieved Jul. 23, 2001]. Retrieved from the Internet: <http://www.pbs.ork/klru/austin/games/namethattune.html>.
Back to the Tunes [online], [retrieved Jul. 23, 2001]. Retrieved from the Internet: <http://citc5.hispeed.com/rules.html>.
Bonczek et al, "The DSS Development System", 1983 National Computer Conference, Anaheim, California, May 16-19, 1983, pp. 441-455.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
"Darts Revolution Again", Replay Magazine, Mar. 1991, pp. 146-148.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10, 2002.
"Ecast Forges Landmark International Technology Partnership", Business Wire at www.findarticles.com/cf_0/m0EIN/2000_July_25/63663604/print.html, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Fachbuch, "Unterhaltungselektronic von A-Z" gfu 1, VDE-Verlag GmbH, pp. 12-13, 1983-1984.
"Foobar 2000 Evaluation Updated," MonkeyBiz, Aug. 3, 2008, 4 pages (with partial English translation). http://monkeybizinfo.blogspot.jp/2008/08/foobar2000.html.
Gallardo et al., "Tangible Jukebox: back to palpable music", ACM TEI, pp. 199-202, 2010.
Gralla, "How the Internet Works", Millennium Ed., Que Corporation, Aug. 1999.
Grimes, Chapter 18, "Taking Advantage of Web-based Audio".
Hewlett-Packard Development Co; HP Open View Storage Data Protector Admin's Guideline Manual Edition; May 2003; Copyright 2003, 60 pages http://h20000.www2.hp.com/bc/docs/support/SupportManual/c00663793l/c00663793.pdf.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No. 1, Jan. 1998, "Safe Mechanism for Installing Operating System Updates with Applications," pp. 557-559.
iTouch 8 Plus brochure, JVL Corporation, 2005, 2 pages.
iTOUCH 27 New Games brochure, JVL Corporation, 2005, 2 pages.
Johnny Rockets Name That Tune [online], [retrieved Mar. 7, 2002]. Retrieved from the Internet: <http://www.johnnyrockets.com/docs/funstuff.html>.
Koskelainem, "Report on Streamworks™".
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Merriam Webster's Collegiate Dictionary, Tenth Edition, Merriam-Webster, Inc., p. 361 (definition of dynamically).
Mickey B's Jukebox Revue—Name That Tune! [online], [retrieved Jul. 23, 2001]. Retrieved from the Internet: <http://mickeyb.com/tune/>.
Mod Box Internet brochure, Merit Entertainment, 2006, 2 pages.
Newsome et al., "Proxy compilation of dynamically loaded java classes with MoJo", ACM LCTES, pp. 204-212, Jun. 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), Oct. 27, 1 JP 07 281682, figure 1-6 abrége.
Peter Pawlowski, "Basic Player Whose Appearance and Functions can be Customized Freely 'Foobar 2000' v1.0 is Unveiled,"Windows Forest, Japan, Jan. 12, 2010, 3 pages (with partial English translation). http://forest.impress.co.jp/docs/news/20100112 341870.html
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
Stevens, "TCP/IP Illustrated: vol. 1, the Protocols".
Stewart, "Ecast Deploys Marimba's Castanet to Power an Internet-Based, Entertainment Management System for the Out-of-Home

(56) References Cited

OTHER PUBLICATIONS

Market", Marimba, Press Release, 3 pages, www.marimba.com/news/releases/ecast.dec13.html, Dec. 13, 1999.

Strauss et al., "Information Jukebox a semi public device for presenting multimedia information content", Pers. Ubiquit Comput, 7, pp. 217-220, 2003.

Tom & Liz's Name That Tune [online], [retrieved Jul. 23, 2001]. Retrieved from the Internet: <http://home.att.net/~tomnliz/Music.html>.

Vortex Brochure, JVL Corporation, 2005, 2 pages.

Waingrow, "Unix Hints & Hacks", Que Corporation, Indianapolis, IN, 1999.

White, "How Computers Work", Millennium Ed., Que Corporation, Indianapolis, IN, Sep. 1999 (Sep. 22, 1999).

Yuki Murata, iTunes no 'Kankyo Settei' Catalog & Tips 10 Sen, Mac People, ASCII Corporation, Oct. 1, 2007.

\* cited by examiner

DIGITAL DOWNLOADING JUKEBOX WITH REVENUE-ENHANCING FEATURES

CROSS-REFERENCES TO RELATED APPLICATIONS

This application is a continuation of application Ser. No. 14/313,274 filed Jun. 24, 2014 which is a divisional of application Ser. No. 12/737,395 filed Jan. 7, 2011 now U.S. Pat. No. 8,849,435 issued Sep. 30, 2014, which is a National Phase of International Application No. PCT/US2009/003998 filed Jul. 9, 2009, which claims the benefit of Provisional Application No. 61/129,637 filed Jul. 9, 2008, the entire contents of each of which are hereby incorporated by reference in this application.

FIELD

The exemplary embodiments described herein relate to, for example, jukebox systems and, more particularly, to digital downloading jukebox systems of the type that typically include a central server and remote jukebox devices that communicate with the central server for royalty accounting and/or content updates and, still more particularly, to jukebox systems that have revenue-enhancing features such as, for example, music recommendation engines and bartender loyalty programs.

BACKGROUND AND SUMMARY

Jukeboxes have been around for decades and provide users with the ability to select desired music for reproduction in a convenient and advantageous manner. Jukeboxes conventionally have been provided in commercial establishments, such as restaurants and bars, to provide desired music on demand for patrons thereof for a fee. Over the last several years, a new generation of jukebox devices have become available that provide significant improvements in the operation thereof for all parties involved. More specifically, the conventional standalone phonorecord and CD jukeboxes are being replaced by digital downloading jukeboxes that are controlled by and communicate with a central server. An example of this new generation jukebox system is shown in U.S. Pat. No. 6,308,204, the entire disclosure of which is incorporated herein by reference. A leading provider of this new generation of jukebox systems is TouchTunes Music Corporation.

FIG. 1 shows an overview of an exemplary embodiment of a digital downloading jukebox system 10 (hereinafter referred to simply as a "jukebox system"). As shown in FIG. 1, the jukebox system 10 includes a central server 12 that contains a master library of audio content (typically music), as well as or alternatively audiovisual content (typically music and associated video or graphics), that can be downloaded therefrom. The jukebox system also includes a series of remote jukebox devices 16, 16a-16f. Each of these jukebox devices generally are located in a bar, restaurant, club, or other desired location, and are operable to play music in response to receiving a payment from a user, such as coins, bills, credit/debit card, etc., and having one or more songs selected by the user for play. In an alternative embodiment, a music service is paid for on a subscription basis by the location, and the selected music is free for the end-user. The jukebox device 16 typically includes a screen 18 that presents information to the user and allows the user to select songs therefrom, as well as an audio system 20 that plays the selected songs. The screen 18 also may be used for displaying song-related video or graphics. The screen 18 also may be used to display advertisements for the jukebox itself to attract customers thereto, to display other types of advertisements, and/or to display any other desired information.

The jukebox devices 16 (sometimes referred to as simply "jukeboxes" herein) are operable to communicate with the central server 12 through a communications network 14, such as, for example, the Internet. The jukeboxes 16 periodically communicate with the server 12 to provide information to the server 12 regarding the specific songs that have been played on the jukebox. The central server then uses this information to determine the appropriate royalties and/or other payments that are owed for songs played on each jukebox. Thus, one advantage of this new generation of jukeboxes is that the sound reproduction and/or other applicable music rights can be adhered to in a more accurate and reliable manner, thereby assuring the proper royalties are paid to the artists or music owners. The central server 12 also can provide new songs to the jukebox 16 to assure that the appropriate or most popular songs are maintained on the jukebox based on the specific customers at that location. Thus, the songs available on each jukebox can be customized through communication with the central server to provide the songs and/or types of music that customers generally request at each jukebox location. As described in the above-referenced U.S. Pat. No. 6,308,204, the central server also advantageously can be used to update the operating software on the jukeboxes in order to, for example, change the operation of the jukebox, such as to provide new or improved features. Thus, another advantage of this new generation of jukeboxes is that the songs (or other audio and/or visual content), and the operation of the jukebox itself can be remotely changed as desired, thereby reducing the need to have someone (such as a routeman) personally service the jukebox. Instead, such updates can be done using the central server 12.

As indicated above, the jukebox devices 16 each include a mass storage device, such as a hard drive, which stores the songs and associated video/graphics data (if any), as well as any other desired graphical information for reproduction on the jukebox. The mass storage device of the jukebox typically has limited storage capacity relative to the storage device of the central server 12. As a result, only a fraction of the songs stored on the central server typically are stored on the mass storage device of the jukebox at any one time. There may be other reasons as well, such as for security of the data or limited room in the jukebox itself, for having limited storage capacity on the jukebox and/or limiting the number of songs stored thereon. For example, physical space may be limited on wall-mount jukeboxes or the like, which are designed to be small in size as compared to free-standing models. As explained above, the songs on the jukebox can be changed through communication with the central server, but typically any one jukebox only stores a relatively small subset of the complete library of songs maintained by the central server at any one time.

To increase the revenue that a jukebox generates, the most desired songs may be made available on the jukebox over time. If customers cannot find songs they like on the jukebox, usage of the jukebox (and the revenue generated thereby) may be reduced. On the other hand, it is difficult to predict in advance exactly what a customer at any particular location will desire to play on the jukebox. In fact, there are likely many instances where a customer would have selected a song that exists on the central server but is not currently present on the jukebox. As a result, the jukebox may not be enjoyed and used to its fullest extent. To address this problem and increase revenue, jukebox systems have in the past provided a feature that enables the user to search for songs on the central server from the jukebox and request an immediate download of a desired song from the central server to the jukebox for an additional fee. This feature enables the user to play any song in the master library of songs maintained by the central server using the jukebox, regardless of whether the specific song is presently stored in the mass storage of the jukebox itself. Thus, the user can first look for desired songs on the local storage of the jukebox and then, if desired, search further on the central server for desired songs. The jukebox device typically charges an additional fee (such as five credits instead on one credit) for an immediate download and play of a song from the central server as opposed to a standard play directly from the jukebox's local storage.

For most users, a relationship with a jukebox extends only as far as a choice of songs to play. Casual users may find it difficult to make selections rapidly and/or to locate specific songs. Regular users, however, frequently choose the same songs, and they may become frustrated with always having to make the same selections. Both problems may result in a loss of revenue from intimidation, frustration, etc.

Accordingly, it is a feature of certain exemplary embodiments to create a relationship between the jukebox and the patrons, in view of the further feature of creating a relationship with a whole community of jukebox users. Such a system can establish a trust relationship between the jukebox and the patrons, while also creating a sense of ownership for the patrons by allowing them to customize their services and communicate with their friends. Such a relationship and feeling of ownership can greatly increase the convenience of using a jukebox and its related services while also decreasing intimidation, frustration, etc.

In certain exemplary embodiments described herein, the jukebox can be made the centerpiece for music services as well as other services that enhance the experience of users as well as the revenues of location managers. For example, a jukebox can become a contact point at a given location through which users can reach out to their friends. For instance, users may call a get together using the jukebox, share music through the jukebox system, or meet up at a jukebox if they become separated at a crowded club. Similarly, a jukebox can become, for example, a contact point at a given location through which the manager of the location can reach out to customers. For instance, a manager can advertise specials, notify regulars of special events, etc. Such communications can be initiated by users, by location managers, or by the jukebox itself.

When jukebox users leave a location, their connection to the music, and, more particularly, the jukebox itself, typically ends. Users provide massive amounts of data to the jukeboxes, such as, for example, which users like certain types of music or certain songs, when they listen to music, how frequently they listen to it, etc. With conventional jukeboxes, this information is not leveraged to provide additional features and/or services to interested users. Thus, collected information typically is wasted, and users experience only a fleeting sense of ownership. Users cannot, for example, recreate the experience of a particular night out.

Proprietors also lose out, because their connection to jukebox users disappears when users leave their establishments. Thus, proprietors lose customers until they return and are forced to rely on traditional, often ignored, methods of bulk advertisement. This form of advertising typically lacks specificity and does not reflect a personalized sense of belonging for users. Additionally, proprietors also cannot recreate specific events at which, for example, they had a particularly profitable nights.

Online communities typically, for example, on the Internet, have sprung-up to try to connect disparate users in a virtual space. These communities provide potentially continuous access to a broad range of features and users alike. However, conventional online communities are virtual only—when a user steps away from a computer, the connection, quite literally, is broken. Thus, while users may access this broad host of features and customize their experiences and even build an online persona complete with, for example, buying and viewing habits, the experience is fleeting.

By connecting jukebox users through an online community, however, the information provided to the jukebox can be used to provide a variety of features and services to the users. And, because jukeboxes are present at thousands of meeting points, connections exist at thousands of physical locations apart from the online virtual community. Thus, by leveraging the data collected by jukeboxes and tying users to an online community, a mixed real-and-virtual community may be established, for example, creating a lasting sense of ownership, personalizing services for potentially all users, drawing users together, establishing a vibrant socially active community of users connected by music, etc. Proprietors may similarly benefit by, for example, achieving a pipeline to additional business by connecting with customers while they are away from their locations, thus drawing them to their locations, etc.

Thus, a jukebox with an associated remote application can, for example, change users' perceptions of jukeboxes. Jukeboxes need not be stand-alone devices accessible only at bars. Rather, certain exemplary embodiments allow users to consider jukeboxes as, for example, media centers, meeting points, portals to online communities, etc. Moreover, with the advent of web-enabled portable devices (such as, for example, cell phones, personal digital assistants, etc.), users even can take the virtual community with them wherever they go. Users potentially may use portable devices to directly download music at any time, such as, for example, when they hear a song at home, in the car, at a bar, etc.

In certain exemplary embodiments, users' actions on jukeboxes and/or via remote interfaces may be represented by avatars specific to and/or customizable by the user. Jukeboxes may include avatar action programmed logic circuitry (e.g., any appropriate combination of hardware, software, or the like) to take actions on behalf of and/or represent the actions of the user. Such actions may include introducing songs with audio and/or video, singing and/or dancing along with music, marking online transactions (e.g., messages, postings, file transfers, etc.), etc. As such, user avatars may yet further increase senses of ownership and/or belonging, drawing users to jukeboxes. Moreover, avatars may further increase the enjoyment of the individual user, regular patrons, and/or newcomers to an area.

Although these features all have contributed to increased senses of ownership and personalization of jukeboxes, further improvements still could be made. The success of a jukebox operating model may be measured, in part, by assessing the revenue earned per jukebox. It will be appreciated that a higher per-jukebox revenue would be indicative of a healthy operating model in which jukebox providers, operators, proprietors of location, and jukebox end-users all benefit. Thus, it will be appreciated that there is a need in the art to increase the revenue earned per-jukebox. Furthermore, inasmuch as some jukebox patrons over time become accustomed to and complacent with conventional jukebox features and even new jukebox features provided to digital downloading jukeboxes, it will be appreciated that there is a need for innovative techniques for both increasing per-jukebox revenue as well as keeping jukebox patrons engaged with the jukebox. Still further, it will be appreciated that there is a correlation between keeping jukebox patrons engaged and maintaining a healthy jukebox operating model.

Accordingly, certain exemplary embodiments relate to jukebox systems that have revenue-enhancing features such as, for example, music recommendation engines and bartender loyalty programs. Such innovative techniques help to both increase per-jukebox revenue as well as keep jukebox patrons engaged with the jukebox.

In certain exemplary embodiments, a method of operating a digital jukebox device is provided. A plurality of instances of media available for playback via the digital jukebox device is provided. A number of credits available for use on the digital jukebox device is collected from a user of the digital jukebox device. Instances of media are queued-up for playback via the digital jukebox device in exchange for a first predetermined number of credits and subtracting the first predetermined number of credits from the number of credits available. It is determined when the number of credits available falls below a predetermined threshold. When the number of credits falls below the predetermined threshold, at least one recommended instance of media is recommended to the user for possible playback on the digital jukebox device in exchange for a second predetermined number of credits.

In certain exemplary embodiments, a digital jukebox device is provided. A storage location stores a plurality of instances of media available for playback via the digital jukebox device. A payment acceptor is configured to collect a number of credits available for use on the digital jukebox device from a user of the digital jukebox device. A user interface is configured to enable the user to select instances of media for playback via the digital jukebox device in exchange for a first predetermined number of credits, with the first predetermined number of credits being subtracted from the number of credits available following a selection. A music recommendation engine is configured to (1) determine when the number of credits available falls below a predetermined threshold, and (2) when the number of credits falls below the predetermined threshold, recommend to the user at least one recommended instance of media for possible playback on the digital jukebox device in exchange for a second predetermined number of credits.

In certain exemplary embodiments, a method of implementing a staff member loyalty program on a digital jukebox device provided at an out-of-home location is provided. At least one condition under which staff members are to be provided with points in connection with the loyalty program is defined, and a number of points are associated with each said condition. At least one staff member logs in to the loyalty program via the digital jukebox device. Upon each occurrence of the at least one condition, the number of points associated with the relevant condition is provided to the at least one staff member.

In certain exemplary embodiments, a digital jukebox device provided at an out-of-home location is provided. A user interface is configured to enable at least one staff member to login to a staff member loyalty program system via the digital jukebox device, with the loyalty program system defining at least one condition under which staff members are to be provided with points in connection with the loyalty program, and with a number of points being associated with each said condition. Upon each occurrence of the at least one condition, the digital jukebox device is configured to provide the number of points associated with the relevant condition to the at least one staff member and update the loyalty program system accordingly.

Certain exemplary embodiments may be implemented as any suitable combination of programmed logic circuitry (e.g., hardware, software, firmware, and/or the like). For example, the processors, modules, graphical user interfaces, etc. of certain exemplary embodiments may be implemented as any suitable combination of programmed logic circuitry. Additionally, certain exemplary embodiments may be tangibly stored as instructions on a computer readable storage medium.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 9 is a flowchart showing an exemplary process for a priority play queue with prioritization-based-on-bidding capability;

DETAILED DESCRIPTION

Figure 1:
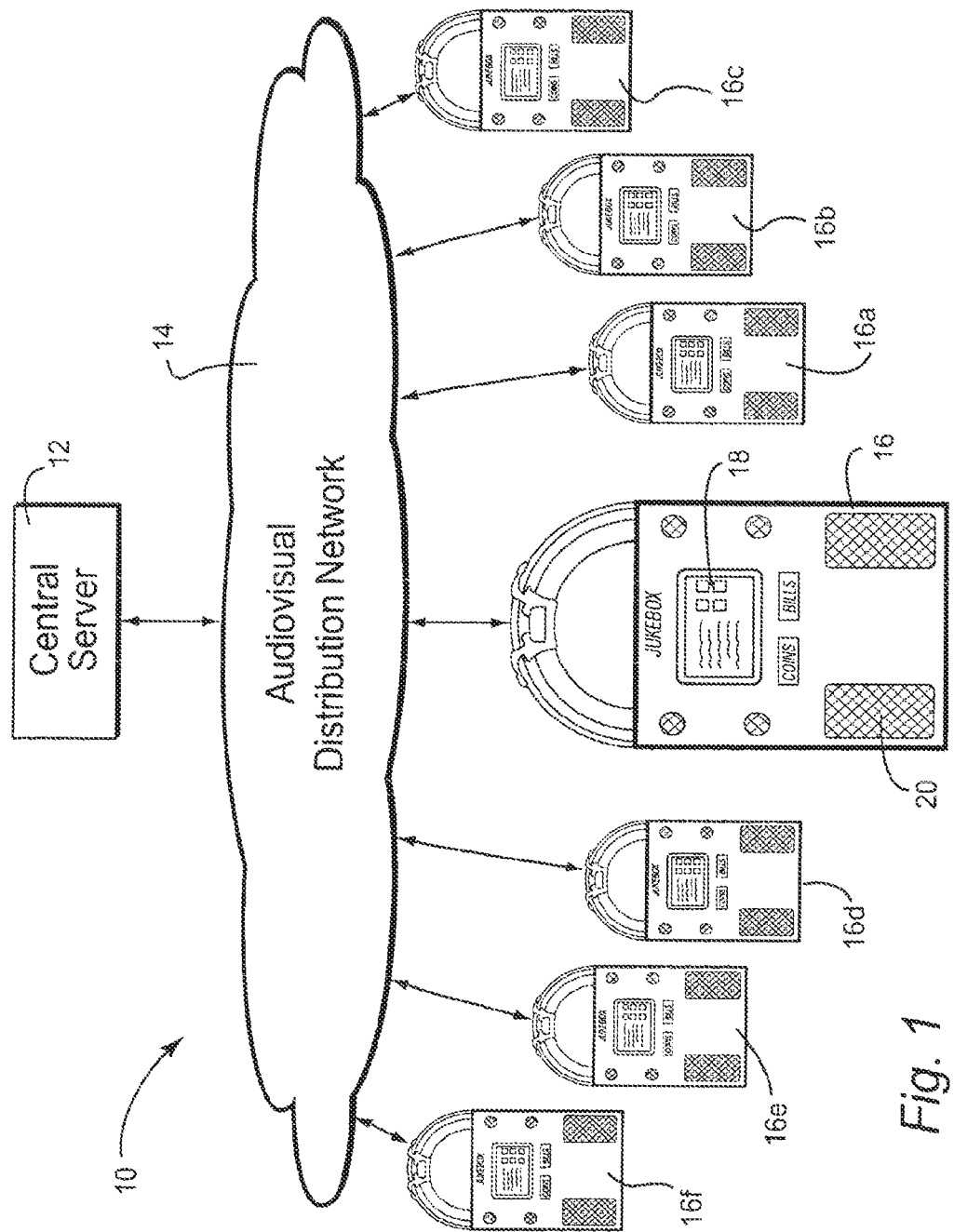
FIG. 1 is a block diagram of a conventional downloading digital jukebox system.
Figure 2:
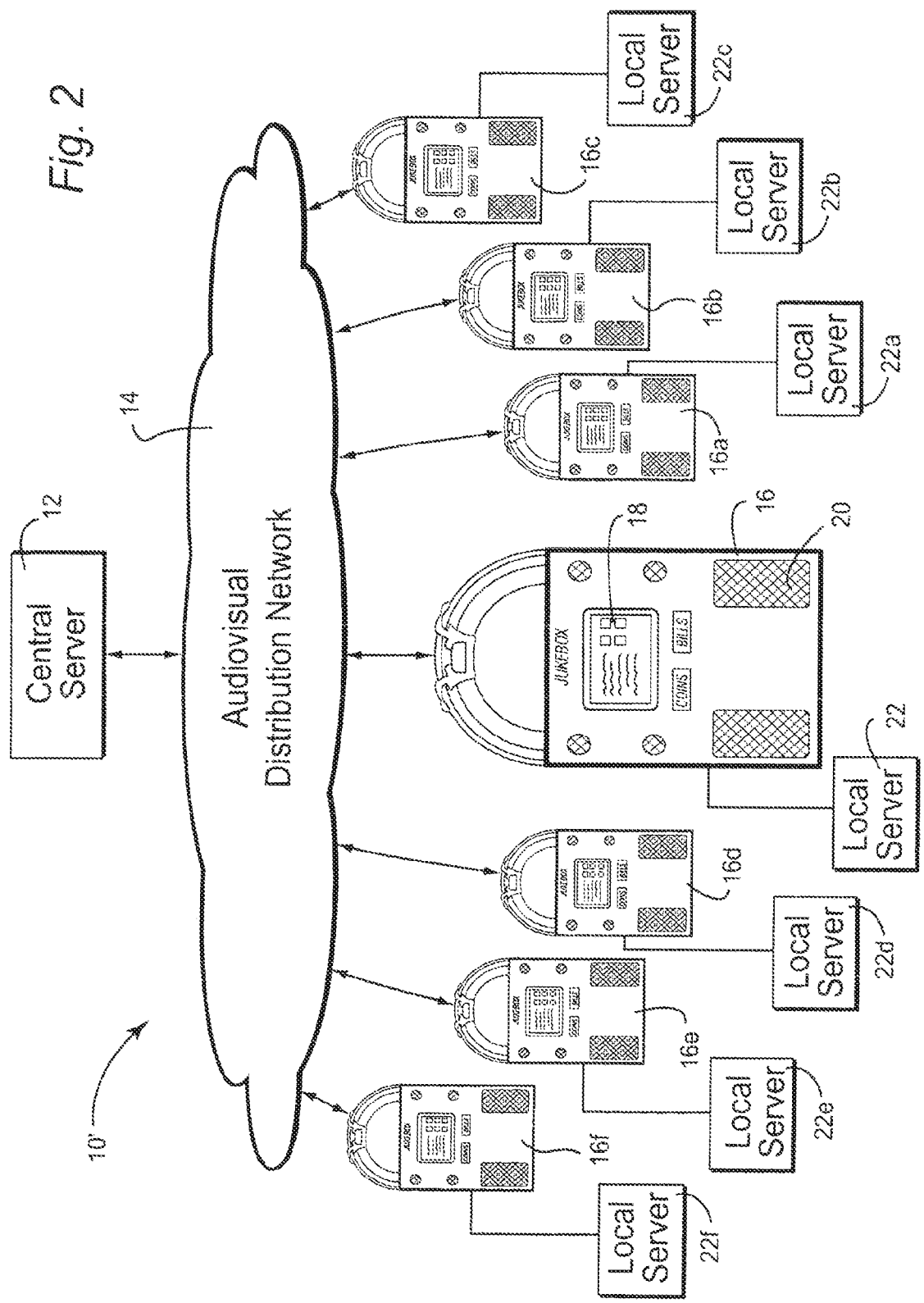
FIG. 2 is a block diagram of an improved downloading digital jukebox system in accordance with an exemplary embodiment.

Referring now more particularly to the drawings, FIG. 2 shows a block diagram of an exemplary embodiment of an improved jukebox system 10'. The jukebox system 10' includes similar elements as shown in FIG. 1 and described above, including a central server 12, communications network 14, and remote jukebox devices 16, 16a-16f. However, the jukebox system 10' further includes local servers 22, 22a-22f respectively connected to each of the jukebox devices 16, 16a-16f. The central server 12 includes a master library of songs (and/or other content). Each of the jukebox devices includes a subset of the master library on a local storage device of the jukebox. The central server may be used to individually manage the contents of the jukebox device, by monitoring usage of and updating the subset of songs on each of the jukebox devices with the intent of maximizing the usage thereof. The central server 12 periodically receives data from each of the jukeboxes for the purpose of royalty accounting and payment for songs played. The jukebox devices may connect to the network in any suitable manner, such as dial-up modem or broadband modem (e.g., DSL, cable, wireless broadband, or satellite). The communications network 14 may be any suitable network capable of distributing data (e.g., audiovisual data) from the central server 12 to the jukeboxes 16 and enabling data to be uploaded from the jukeboxes 16 to the central server 12.

The songs (and/or other data) may be digitized, compressed, and encrypted by the central server 12 prior to sending songs to the jukeboxes for security and bandwidth purposes using known techniques. The songs may then be decompressed and decrypted by the jukeboxes for storage and reproduction thereon. Thus, each of the jukeboxes can maintain in a database a library of digitized songs for play on the jukebox, wherein the library can be changed or updated through communication by the central server. The jukeboxes also may receive and store data constituting images (e.g., still and/or moving video and/or graphical images) that can be displayed on the display 18 of the jukebox device 16. In one exemplary embodiment, the jukebox devices have similar structure and operation described in U.S. Pat. No. 6,308,204 referenced above. Thus, the jukebox devices 16 each may include one or more microprocessors, such as a main CPU and an audio DSP, a memory, such as a hard drive, for storing songs and/or other content, a display for displaying visual items, an audio arrangement 20 for providing audio, a communication system for enabling the jukebox to communicate with the central server 12 through the communications network 14, and operating software, possibly including a multitasking operating system, that controls the operation of the jukebox.

The operating software also may be updateable through communication with the central server 12 as described, for example, in U.S. Pat. No. 6,308,204 referenced above. The jukeboxes 16 further include one or more payment devices, such as coin, bill, and/or credit/debit card input devices, for enabling a customer to pay for usage of the jukebox device in a convenient manner. The screen 18 is a touch screen that enables the user to input selections by touching the screen.

Each jukebox device has, in one exemplary embodiment, a local server 22 that can be accessed by the jukebox device. The local servers are respectively connected to the jukebox devices using Ethernet or other type of local connection. In another exemplary embodiment, the local server simply may be a logical extension (e.g., partition, directory, or area) of the jukebox's hard drive, rather than a separate hardware device. The local servers 22 each may include a mirror copy of the master library of musical recordings maintained by the central server 12. The local server 22 can be loaded with the master library by the entity that owns and/or controls the jukebox network prior to shipping the local server and jukebox device to the jukebox distributor or operator. Of course, over time, the local sever will no longer correspond identically to the central server, because of the fact that the central server may be continually updated with additional or new songs. Thus, the local servers 22 also may be updated periodically to maintain a correspondence with the library on the central server 12. This updating can be done, for example, by the central server 12 through communication with the jukebox devices connected with the local servers 22 using, for example, either dial-up or broadband modems. Alternatively, the updating can be done personally with an update tool that can be connected by a routeman or other person directly to the jukebox or local server for the purpose of updating the contents of the local server. The portable tool could include a removable storage medium, such as a hard drive, that could be returned to and reused by the owner of the jukebox system for future updates. The tool itself could be kept by the operator or other person in charge of maintaining specific jukeboxes for use upon receipt of the updated removable storage medium from the owner of the jukebox system.

For security reasons, the local server 22 may not include all of the digital data that constitutes any one song that is stored on the local server 22. In addition, the part of the song that is on the local server is encrypted. The jukebox device 16 contains the missing part of each of the songs on the local server, thereby enabling the jukebox to assemble the complete song based on the contents of the local server and the memory on the jukebox device. The missing data located on the jukebox may be needed to decrypt the songs, for example. For example, a single block (or other small fraction) of data for each song may be missing on the local server but present on the jukebox device, and the encryption may be based on the missing block and may proceed on a block by block basis. Thus, none of the blocks can be decrypted without obtaining and/or decrypting a preceding block. This feature provides significant security and prevents or deters theft or other type of unauthorized use or copying of the songs on the local server. Thus, in this embodiment, each local server must be specifically assigned to a specific jukebox device so that the decryption described above can be properly performed.

In accordance with an exemplary embodiment, the local servers may also each be individually registered with and identified to the central server 12, so that the central server can individually manage and monitor each local server. The same is true for the jukebox device itself, e.g., it may also be registered with the central server so that it too can be individually monitored and managed by the central server. As will be understood from the foregoing description, the local servers become an advantageous part of the jukebox system by allowing the contents thereof to be accessed by the jukebox device to provide additional services (such as providing additional songs) not available on the jukebox device itself. As will be explained below, the song library of the central server and/or the storage capacity itself can be advantageously used to provide services to other jukeboxes, such as fee-based residential and commercial jukeboxes and/or other fee-based equipment.

Figure 3:
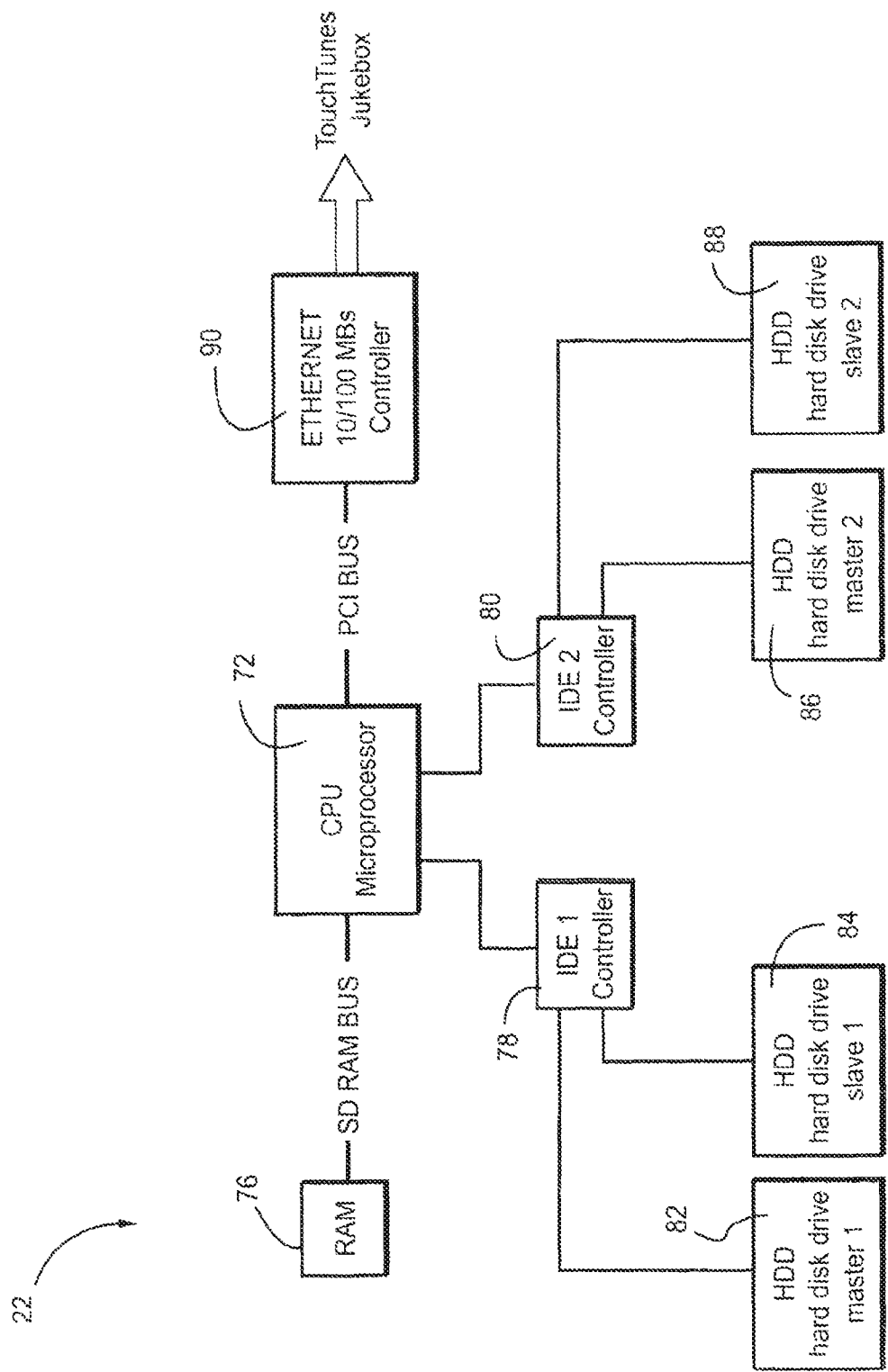
FIG. 3 shows a block diagram of an exemplary embodiment of the local sever.

FIG. 3 shows a block diagram of the electronic elements that define the local server 22 in accordance with an exemplary embodiment. As shown in FIG. 3, the local server 22 includes a CPU 72, a memory (e.g., a flash memory) containing the BIOS and OS, a pair of master/slave hard drives (82, 84 and 86, 88, respectively), a pair of IDE controllers 78 and 80 for the hard drive pairs respectively, a RAM 76, an Ethernet controller for controlling communication with the jukebox device 16, and the appropriate buses interconnecting the various elements. Of course, other configurations or arrangements for the local server 22 may be used. A unique identifier may be provided in the local server for enabling the local server to be uniquely identified and registered by the jukebox and/or central server. The identifier may, for example, be located in the flash memory 74.

As will be appreciated from the description of the invention above, the addition of the local server significantly enhances the operation of the jukebox devices that are part of a jukebox system. However, the local servers also provide other benefits and features.

A collection of local servers 22 may be used as a network of distributed servers that can be controlled by the central server 12 through its associated jukebox device 16 to provide music services to other devices. For example, the local servers and associated jukebox can be used to deliver requested songs to a dedicated residential or commercial jukebox device (or other suitable jukebox device) in addition to providing song services to the specific jukebox to which it is connected and assigned. Thus, the network of distributed servers can provide a support network for implementing residential and commercial jukeboxes of the type which allow a user to download songs for reproduction and/or storage at a residential or commercial location for an appropriate fee. As a result, the jukebox system operator can provide and control commercial jukeboxes and well as residential jukeboxes through the jukebox system. In one exemplary embodiment, the jukebox device and/or local server are connected to the Internet (or other suitable network) using a broadband modem and is provided with software that can selectively deliver song files to any dedicated residential jukebox device (also connectable to the Internet) under control of the central server. The central server receives requests from a residential jukebox and, by analyzing traffic on the network, provides instructions to a selected jukebox device to download the requested song file (either from its memory or from the local server) to the residential jukebox for a fee or under a subscription plan for the residential jukebox. In certain exemplary embodiments, requested songs may be streamed to a jukebox. It will be appreciated that streamed media may originate at a dedicated server, a network of streaming servers, from a jukebox or jukeboxes (such as peer-to-peer or multipeer downloading), etc.

In accordance with another exemplary aspect of the invention, the local server and jukebox device are used, under control of the central server, to provide management services for other types of coin operated or payment triggered equipment, such as gaming devices, installed in the same location as (or in close proximity to) the jukebox. In other words, the jukebox system may be used to update the functionality of and/or manage other downloading devices present in the same location. As a result, the jukebox becomes a "central hub" for all downloading equipment in a location. This feature is achieved, in one exemplary embodiment, by networking all of the downloading devices in a single location together with the jukebox and local file server. The central server can then download information to the local server together with instructions to the jukebox as to which devices should updated with what data and/or software. The jukebox device and central server can also be used to collect information from the other downloading devices to which it is managing and upload that information to the central server for reporting/accounting purposes. Thus, the owner/operator of the jukebox system can act as a third party service provider to other coin-op companies for the purpose of managing and/or updating their equipment.

The large amounts of memory provided by the local servers and the fact that they are provided and accessible at thousands of locations over a well controlled network, turns the jukebox system into a powerful tool that can be used to perform a variety of functions in the coin-op industry. More and more coin-op manufacturers are going towards games that are software upgradeable through their internal hard drives. These updates are done periodically, but as these devices increase there will be an ever increasing need for a system that can reliably and efficiently perform the updates from a remote location. The jukebox system described herein satisfies this need by enabling suitable electronic coin-op devices at a jukebox location to be managed by the central server using the jukebox and local server at the location. The central server can download software or data updates, store them on the local server and then dispatch the updates to the intended units of equipment in the establishment. Thus, the jukebox system can act as a third party service provider to other companies in the coin-op business, thereby enhancing the functionality of the jukebox system.

As explained above, the local server enables songs to be downloaded to a commercial jukebox to which it is assigned or to residential jukeboxes under control of the central server. In addition, the local servers can be used for an on-premise networked application which manages other coin-op devices. These various features of the instant invention are illustrated in FIG. 4.

Figure 4:
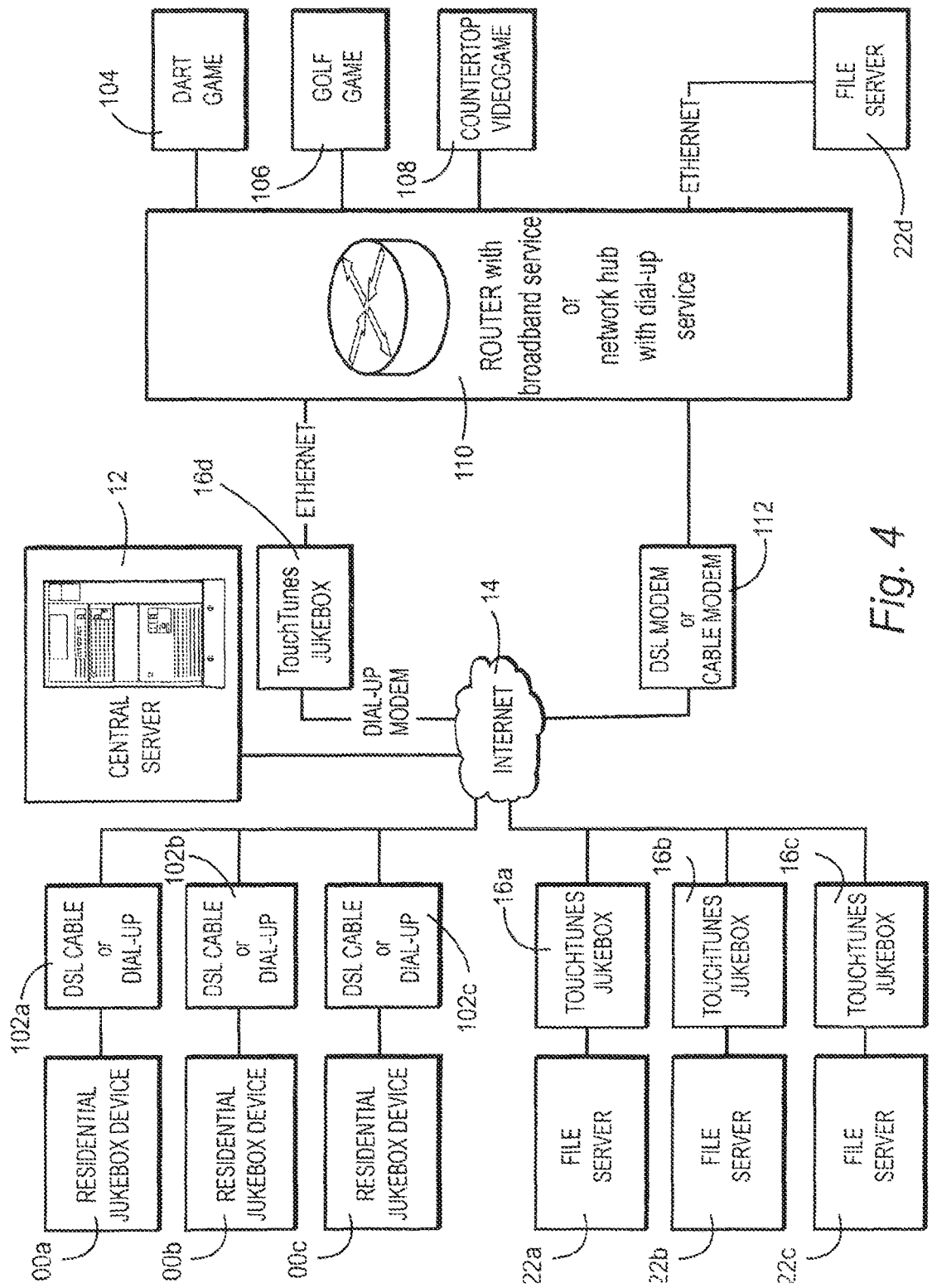
FIG. 4 shows a block diagram of an exemplary overall network including commercial jukeboxes and residential jukeboxes, as well as other downloading devices and associated connections that are managed by the jukebox system.

FIG. 4 shows a block diagram of a complete jukebox system network as contemplated by an exemplary embodiment. As explained above, the system includes a central server 12 connected to a communications network 14, a series of commercial jukeboxes 16a, 16b, and 16c with associated local music file servers 22a, 22b and 22c, a series of residential jukeboxes 100a, 100b, and 100c connected to the network via broadband devices 102a, 102b, and 102c, and an on-premises network shown on the right hand side of FIG. 4. This on-premises network includes a jukebox device 16d connected via a router or network hub 110 to a local file server 22d, a number of additional coin-op equipment, such as a dart game 104, a golf game 106, and a countertop videogame 108, and a broadband modem 112 connecting this local network to the communications network 14. With this exemplary configuration as shown in FIG. 4 all of the functionality described herein can be implemented through the jukebox system of the instant invention.

Figure 5:
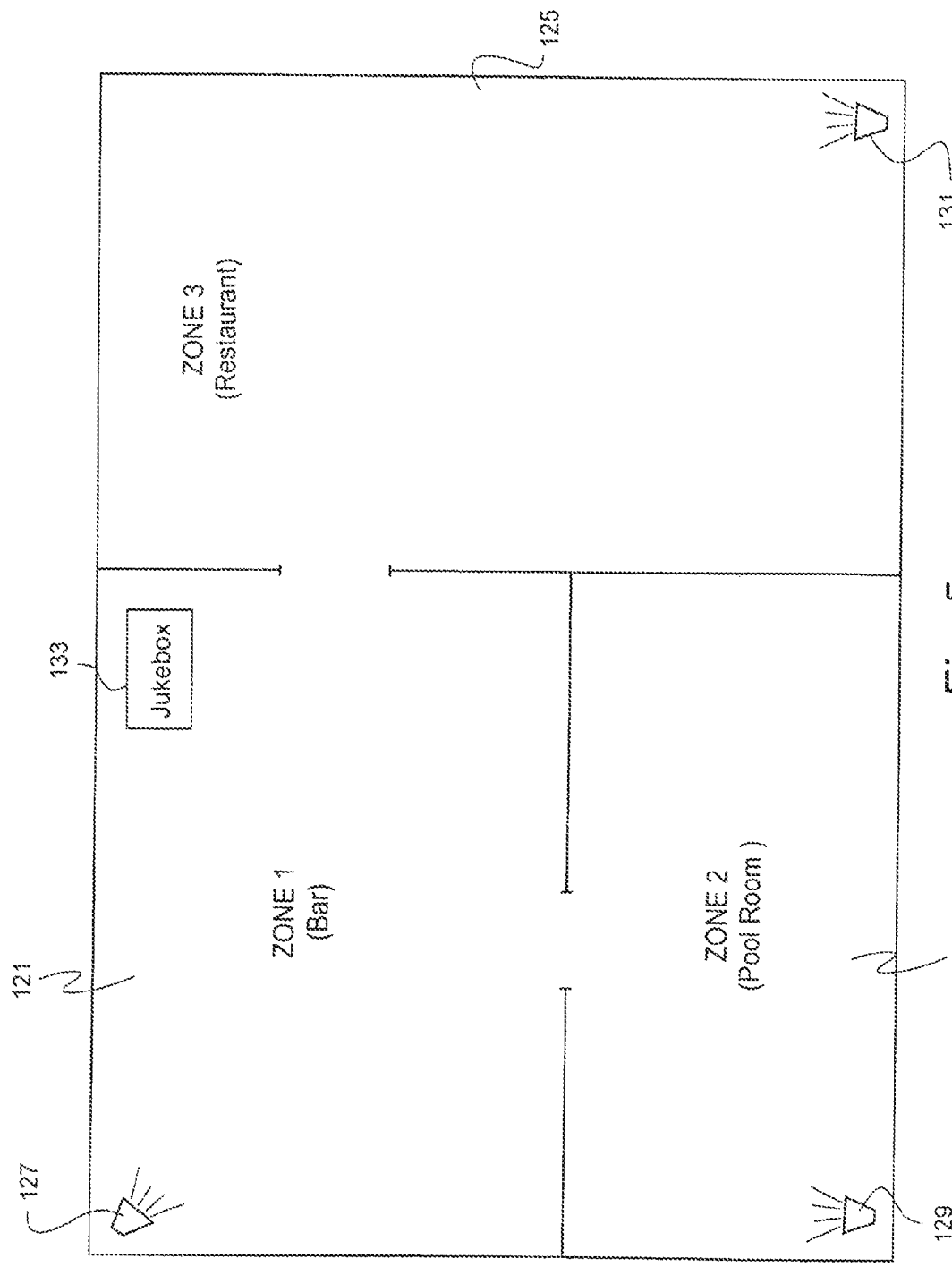
FIG. 5 shows an overhead view of an exemplary establishment layout for a multi-zone jukebox system.

FIG. 5 shows an overhead view of an exemplary establishment layout for a multi-zone jukebox system, in accordance with one exemplary embodiment of the invention. In accordance with an exemplary embodiment, the establishment has three zones 121, 123, 125. Each zone is equipped with its own set of speakers 127, 129, 131, which are operably connected to the jukebox 133. Different music may be played simultaneously in all three zones 121, 123, 125, and all the music may be played from a single jukebox 133. The jukebox 133 may be provided with additional hardware, as needed, to allow for this implementation.

Alternatively, the user may elect to have a song played in more than one of the zones 121, 123, 125 simultaneously, or in more than one of the zones at different times. The user may have to pay additional credits to implement either of these features. An exemplary embodiment of a multi-zone system could play music at a high quality in the different zones using the system described in application Ser. No. 11/023,390, filed Dec. 29, 2004, entitled "Wireless Digital Transmission System for Loudspeakers," which is a continuation in part of Ser. No. 09/161,584, filed on Sep. 28, 1998. The entire contents of both applications is incorporated herein by reference. Using this system, for example, a jukebox could compress and transmit audio data through AC power lines to an addressable location, where it could be received, decompressed, converted, and played. In fact, any of the jukebox components herein could be implemented in a manner that uses AC power lines as a communication network for operation.

It will be appreciated that the Wireless Digital Transmission System can be used for other purposes in other embodiments where data needs to be sent between two or more devices. For example, this system could be used to configure dummy terminals. In such an embodiment, the Wireless Digital Transmission System could be used to send information such as, for example, whether to morph, what songs are appropriate given a particular morphing of the jukebox, the zones in which selected music should be played, maximum volume levels, etc, in addition to sending music to the speaker systems.

The operator may also restrict what kind of music is available in a given zone, based on the type of activity in the zone, the time of day, or any other suitable selection criteria. For example, in FIG. 5, zone three 125 is a restaurant. Restaurant patrons may not wish to listen to the same type of music as someone in zone one 121, which is a bar room in FIG. 5, or in zone two 123, which is a pool room. The operator may recognize this and restrict the type of music that can be played in zone three 125. Alternatively, the operator may restrict the volume of the music in any given zone. For example, patrons of a pool room 123 or a restaurant section 125 may not want the music as loud as it is desired to be in the bar room 121. And maybe the restaurant section 121 is to be kept quieter even than the pool room 123. The owner can adjust and control all suitable settings to provide the most versatile, patron friendly environment in each of the zones, based on any suitable criteria.

Figure 6:
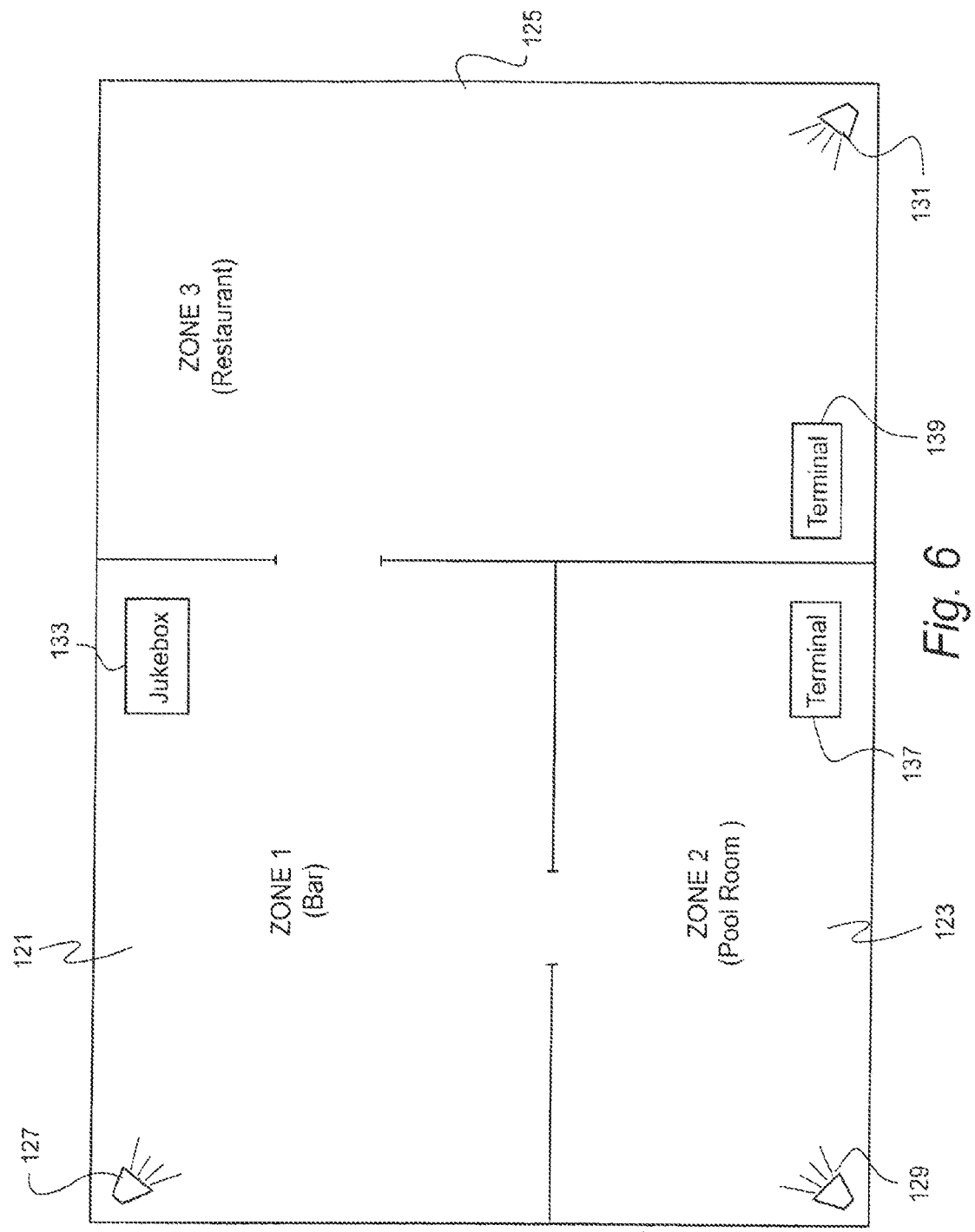
FIG. 6 shows an overhead view of an exemplary establishment layout for a multi-zone jukebox system with selection terminals in each zone.

FIG. 6 shows an overhead view of an exemplary establishment layout for a multi-zone jukebox system with selection terminals in each zone. In accordance with an exemplary embodiment, the bar has three zones 121, 123, 125. Each zone is equipped with its own set of speakers 127, 129, 131, which are operably connected to the jukebox 133. Different music may be played simultaneously in all three zones 121, 123, 125 and all the music may be played from a single jukebox 133. The jukebox 133 may be provided with additional hardware to allow this implementation.

In the exemplary embodiment of FIG. 6 there are also one or more "dummy" terminals 137, 139 located throughout the establishment. An exemplary illustrative dummy terminal could use X-server technology. These terminals 137, 139, which may be stand alone devices or may be provided as part of the interface on a gaming machine or other suitable device with a digital display, allow selection of songs from the jukebox 133 for the zone in which they are located (or possibly other zones). These terminals 137, 139 duplicate the zone restrictions imposed on the main jukebox interface and selection criteria. The terminals 137, 139 may be restricted to only allowing selection of music for play in the zone where each respective terminal is located, or they may allow selection for play in one or more different zones.

Additionally, the graphical interface of the terminals 137, 139 may change in accordance with available selections, themes of the bar, themes of the room in which each terminal is located, or any other suitable criteria.

Figure 7:
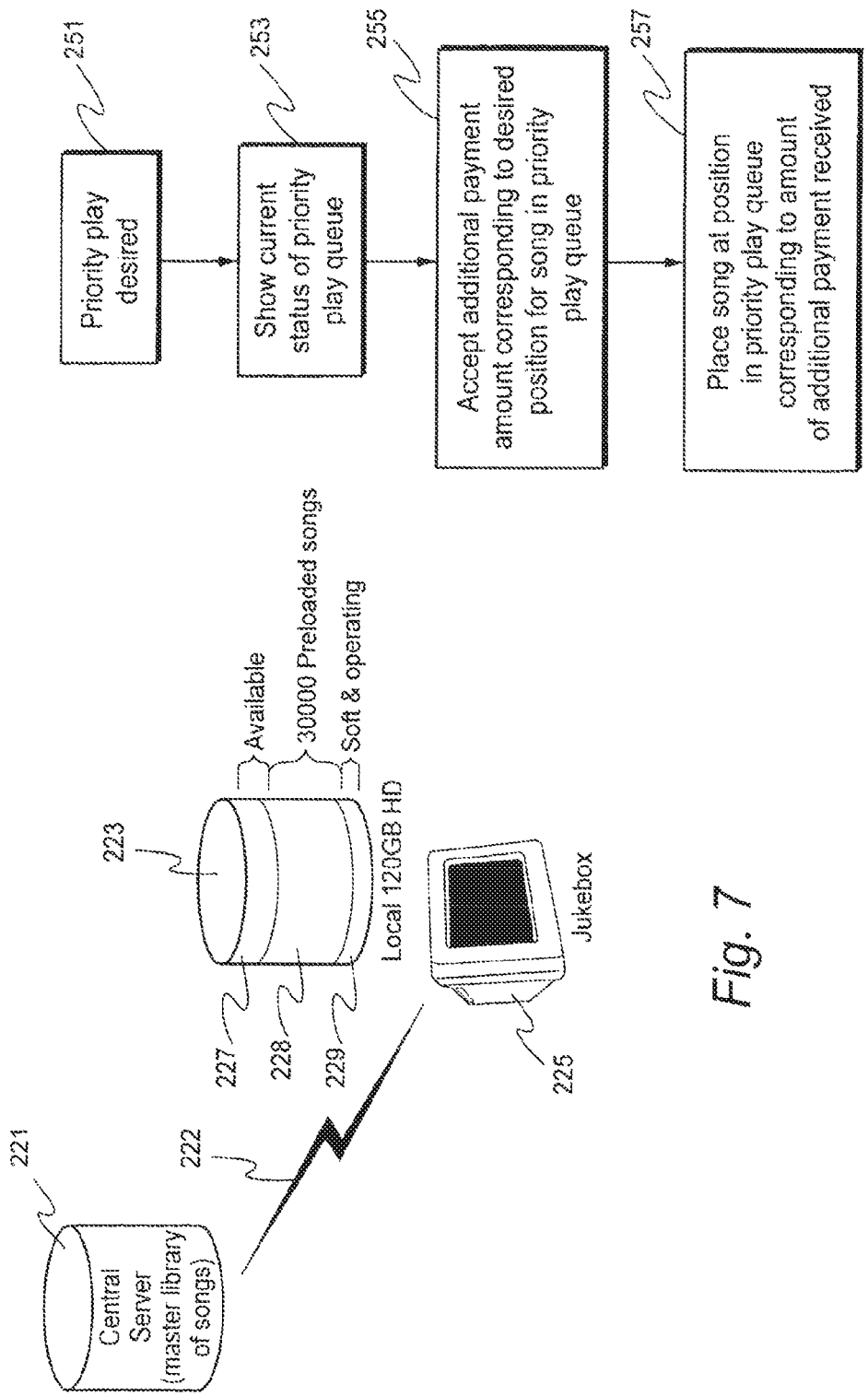
FIG. 7 shows the relationship between a jukebox with expanded media storage and a central server.

FIG. 7 shows the relationship between a jukebox with expanded media storage and a central server. In accordance with an exemplary embodiment, the central server 221 contains a master library of songs, such library comprising all songs that are currently available to be downloaded and all songs currently installed on jukebox hard drives. The central server may communicate 222 with the remote jukebox 225 containing a local hard drive 223. The hard drive 223 on the jukebox may have several sections, including available space for downloads 227, space occupied by preloaded songs 228, and space for software and an operating system 229. Additional suitable sections may be added, including, for example, a section containing different pictures for altering the GUI. The jukebox 225 may communicate with the central server 221 to download songs, upload usage information, update software, and perform any other suitable functions.

Figure 8:
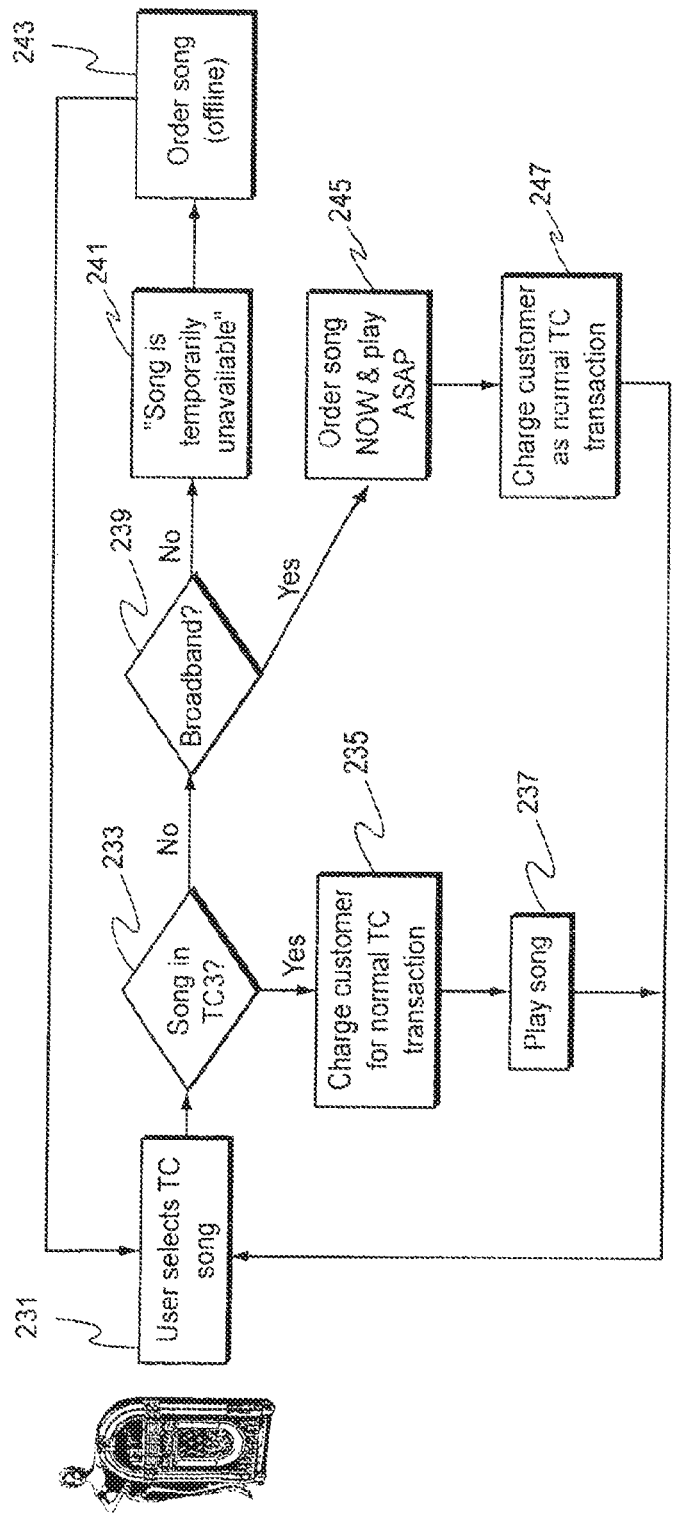
FIG. 8 is a flowchart showing an exemplary process for a song selection process when a song is not in the "standard" available playable song list.

FIG. 8 is a flowchart showing an exemplary process for a song selection process when a song is not in the "standard" available playable song list. In accordance with an exemplary embodiment, the user first selects a song 231. The jukebox checks to see if the song is available on the local hard drive as a "non-standard" selection 233. If the song is available on the local hard drive, the jukebox charges the customer the price set for obtaining and playing a non-standard song 235 and plays the song 237 (or adds it to a playlist, when appropriate).

If the song is not available on the local hard drive, the jukebox checks to see if a high-speed connection to the central server is available 239. If there is no high-speed connection, the jukebox informs the user that the song is temporarily unavailable 241 and orders the song for download 243. The jukebox may or may not charge an additional amount for ordering the song. If, however, there is an available high-speed connection to the central server, the jukebox orders the song immediately and uses the high-speed connection to download the song right away, queuing it up for playing 245. The jukebox then charges the customer the price of a non-standard selection 247. In certain exemplary embodiments, a jukebox may retrieve songs offline, either after a location closes or before it opens. In certain exemplary embodiments, a jukebox may immediately download a song over a dedicated line (e.g., with a dial-up connection). In certain other exemplary embodiments, a song may be downloaded from another jukebox (or other jukeboxes) rather than from a central or limited database to reduce network strain. In certain exemplary embodiments, the jukebox may download songs via a distributed media service in which portions of a given song may be downloaded from a plurality of sources and reassembled for the target jukebox. It will be appreciated that such a peer-to-peer (or jukebox-to-jukebox) or multipeer (several jukeboxes to jukebox) digital downloading network may need to track song licensing information. In certain exemplary embodiments, if a song is not available on a jukebox but other versions or covers are available, the jukebox may recommend to these other songs to the searching user. For example, a user searching for an unavailable Trisha Yearwood version of "How Do I Live" may be recommended available versions by Dolly Parton and/or LeAnn Rimes. Recommendations may be smart enough to ignore similarly named songs that are completely different, such as, for example, the Everly Brothers' "Oh, Pretty Woman" and the Motley Crue's "Pretty Woman."

The factory drive explained above, combined with the morphing capabilities, eliminates the need for the local server explained above, as the factory drive can provide the same services as the local server, without the need for a separate hardware device. In other words, at least some of the factory drive embodiments described herein may enable a jukebox to be shipped with a single mass storage device of any technology (or multiple technologies and/or multiple devices acting as a single mass storage device), while still enabling a basic playable list to be defined, an expanded playable list to be defined, morphing capabilities, local server services to be provided, as well as all other features described herein. The content of the factory drive, as shipped, may be defined using historical, statistical information on customer preferences.

FIG. 9 is a flowchart showing an exemplary process for a priority play queue with prioritization-based-on-bidding capability. According to an exemplary embodiment, the user first indicates that he would like priority play 251. The jukebox then displays the current status of the priority play queue 253. This display may include information such as how many songs are in the queue, what the top bid is, how much has been bid on each song, which songs are "locked in," and any other suitable information about the priority queue. The jukebox then allows the user to select how much additional money the user would like to pay to place his song in a particular spot on the priority list and accepts payment in the selected amount 255. After accepting the payment 255, the jukebox places the song in a position on the priority list corresponding to the additional amount received from the user 257. Alternatively, in another exemplary aspect of the illustrative embodiments, a user can bid on the right to have a song played before other songs previously selected for priority play are played. In an exemplary embodiment, the user is shown the top price paid for a priority play, and can pay more than that price to obtain the highest priority available.

Figure 10:
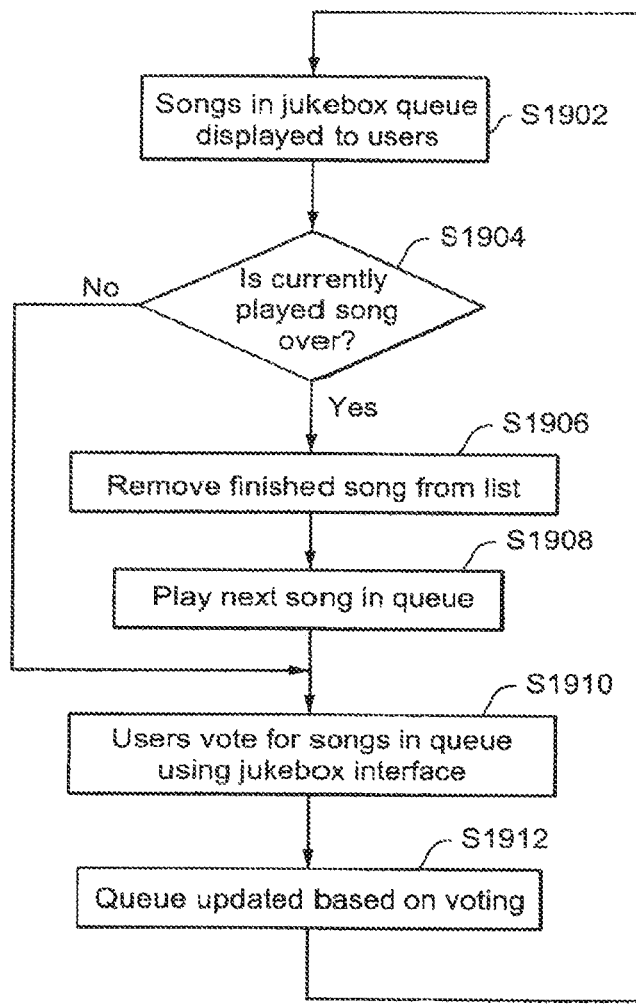
FIG. 10 is a flowchart showing an exemplary implementation of a jukebox voting process.

Similarly, jukebox users may vote for particular instances of media to alter their priority in playlists. In this way, jukebox users can, for example, "battle" for control over the music to be played in a particular zone or particular zones within or among locations. It will be appreciated that this voting/battle mode may be implemented by using, for example, a dynamic queue, a priority queue, multiple queues, etc. It also will be appreciated that a jukebox could be put into a voting mode automatically (e.g., at a particular time of day and/or on a particular day of the week), or it could be triggered manually. FIG. 10 is a flowchart showing an exemplary implementation of a jukebox voting process. Unlike conventional jukebox operations, or even jukebox bidding modes, a list of songs in a jukebox queue is displayed to users in step S1902. This list may be generated automatically, by operators, bar managers, patrons at a bar, etc. The list could be displayed, for example, on a jukebox, or on one or more stand-alone monitors. Additionally, in certain exemplary embodiments, the list could be viewed by a plurality of mobile devices and/or terminals. The information displayed contains at least the artists and names of coming songs, and a number associated with the priority of those songs. The list should be sorted by this number, so that the song with the most "votes" is displayed as the "next" song to be played, followed by the next highest song, etc. Step S1904 determines whether the currently playing song is over. If it is over, step S1906 removes it from the queue, and the next song is played in step S1908. In another embodiment, users could vote to stop/skip the currently playing song (or instance of media) by, for example, exceeding the number of votes the song had before the jukebox started playing.

As users see the coming songs, they will be tempted to push up the songs they like so the songs and/or push down the songs they do not like. In general, the more users who vote, the greater the ambiance of good songs. Thus, after step S1908, or in the case that the song is not over, the jukebox receives users' votes for particular songs in step S1910. Voting can be based on credits (as users buy credits), or tied to a user's account. In certain exemplary embodiments, users must login to place a vote, and in certain exemplary embodiments, users can vote a limited number of times. Users may vote from distinct places within a location. The queue is updated based on this voting in step S1912, and the process returns to step S1902, where the displayed list is refreshed.

In certain exemplary embodiments, the queue may be based on the total number of votes for particular songs. In certain other exemplary embodiments, users may vote for and/or against certain songs and the "net" information may be displayed, indicating the number for and against, or merely the net result. If there are more votes against a song than for, the system can perform one or more of the following functions. For example, the jukebox simply may keep the song in the queue with a negative number of votes. Alternatively, the jukebox may keep the song in the queue with a zero or negative number of votes, but, for example, always wait until the net vote reaches at least 1 before playing the song. Still alternatively, the jukebox may drop any song that reaches zero or a negative number of votes.

Figure 11:
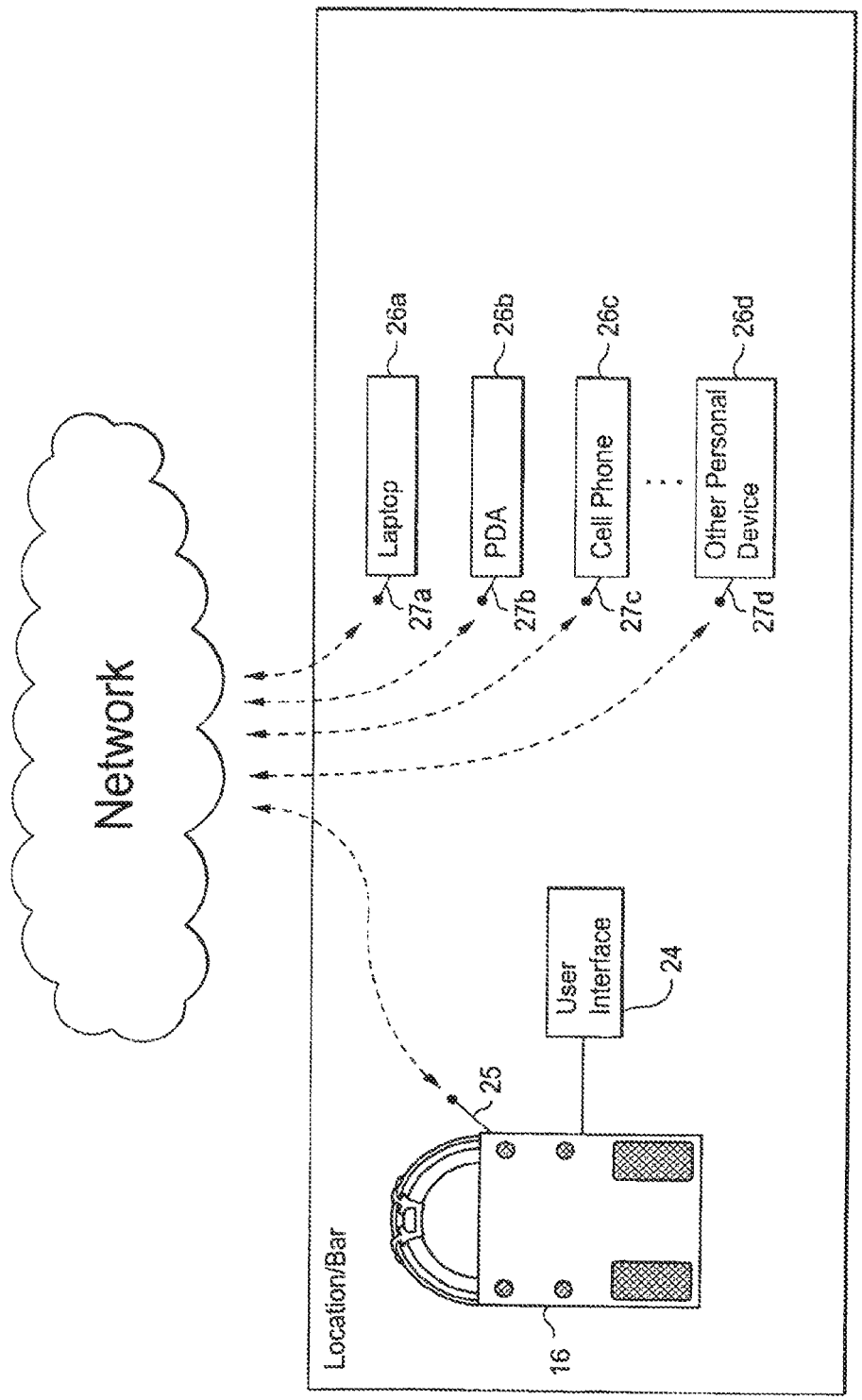
FIG. 11 is a block diagram of an improved downloading digital jukebox system with remote devices accessing a jukebox from within a particular location.

FIG. 11 is a block diagram of an improved downloading digital jukebox system with remote devices accessing a jukebox from within a particular location. A jukebox 16 is located within a particular location, bar, or the like. Users may access jukebox 16 through user interface 24 running thereon. However, users also may access jukebox 16 remotely. Thus, a plurality of mobile devices 26a-26d are shown located in the particular location. Mobile devices 26a-26d are, respectively, a laptop, a PDA, a cell phone, and other personal devices, though it will be appreciated that other properly configured devices may be used. Each mobile device 26a-26d is equipped with a wireless transmitter 27a-27d, respectively. Mobile devices 26a-26d may allow registered users to effectively logon to jukebox devices and access specific content, such as, for example, customized playlists, personalized screens, messages from other recognized users, etc. A change made by one of the mobile devices 26a-26d (e.g. to user settings, playlist setup, etc.) will be reflected by all of the mobile devices 26a-26d. For example, if a user creates a new playlist, edits an existing playlist, changes a password, etc. on a jukebox via user interface 24, user interfaces 24a-24f will reflect that change.

Mobile devices 26a-26d may communicate through an external network to communicate with jukebox 16 having communicator 25. It will be appreciated that mobile devices 26a-26d may communicate over a LAN, wireless Internet, Bluetooth, or any other suitable communications network.

A central database of recognized user information may be maintained and accessible by each of the jukebox devices 16, 16a-f and remote devices 26a-d. However, in some exemplary embodiments, local databases of recognized user information may be maintained on devices. The devices may communicate with each other through a communications network, such as, for example, the Internet. However, it will be appreciated that other communications methods are possible, such as, for example, through wired communications over a LAN, wireless communications, etc.

FIGS. 12-16 provide additional, non-limiting exemplary configurations that remotely access jukeboxes. It will be appreciated that other variations on and combinations of these exemplary configurations are possible and contemplated herein.

Figure 12:
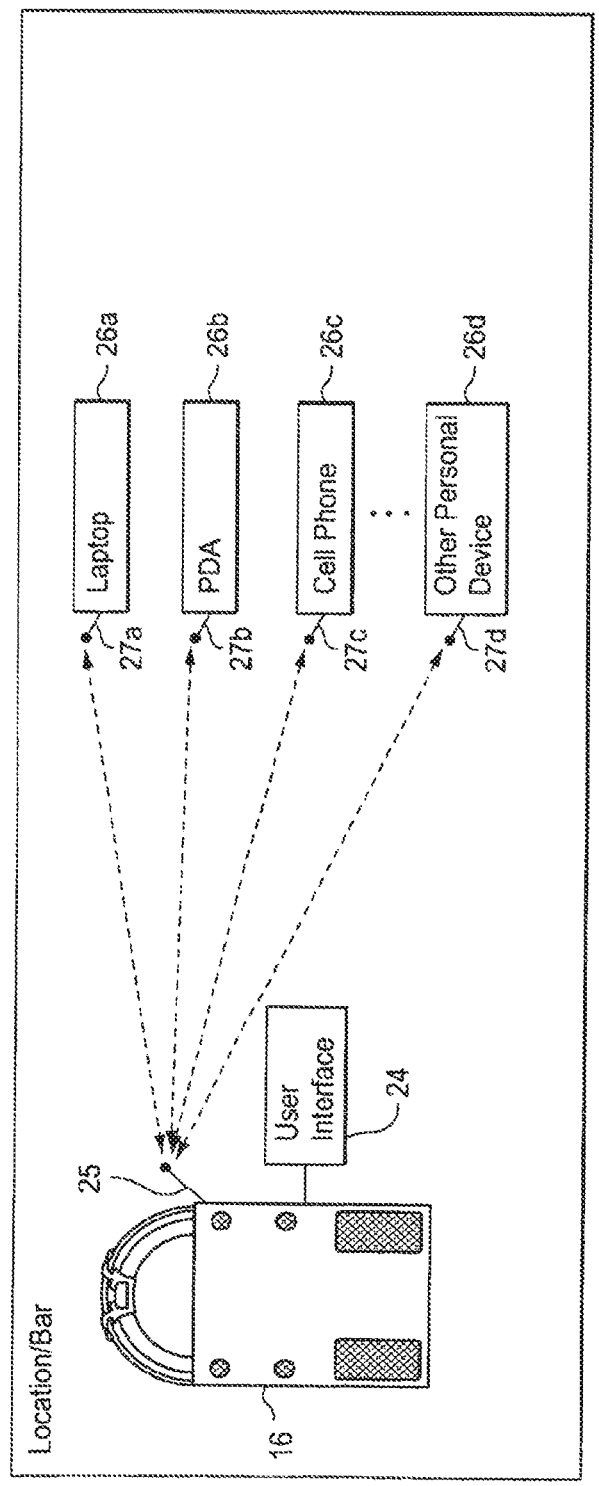
FIG. 12 is a block diagram of an improved downloading digital jukebox system with remote devices accessing a jukebox from within a particular location.

FIG. 12 is a block diagram of an improved downloading digital jukebox system with remote devices accessing a jukebox from within a particular location. In this exemplary embodiment, jukebox 16 and the plurality of remote devices are located within a particular location. Jukebox 16 includes a user interface 24 that allows jukebox users to, for example, make selections, create profiles, edit playlists, etc. Jukebox 16 also includes a wireless communications device 25. Remote devices 26a-26b communicate with jukebox 16 through their respective wireless communication devices 27a-c. In this exemplary embodiment, remote devices 27a-c are, respectively, a laptop, a PDA, and a cell phone. It will be appreciated that other remote devices may communicate with jukebox 16. It also will be appreciated that remote devices according to this system may operably communicate with jukebox 16 from outside the particular location, with the range being determined by the hardware on jukebox 16 and remote devices 27a-c and the protocols over which they communicate. Thus, for example, wireless communications over 802.11g connections may allow for users to access jukebox 16 from within a location, tables setup outside the location, and other areas immediately surrounding the area.

Remote devices 26a-c allow users to login to jukebox 16 remotely, without having to access jukebox 16 and user interface 24 directly. Thus, a user can, for example, play songs, edit playlists, and perform other jukebox-related activities without using user interface 24 directly. It will be appreciated that remote devices 27a-c may have their own user interfaces, which may be the same as or different from user interface 24. User profile information may be stored locally on jukebox 16, on a remote server (not pictured), or on a remote device 27. A change made by a remote device (e.g., to user profile information, playlist contents, purchased media, etc.) would be mirrored on jukebox 16, any other associated remote devices, and/or on other jukeboxes, etc.

Figure 13:
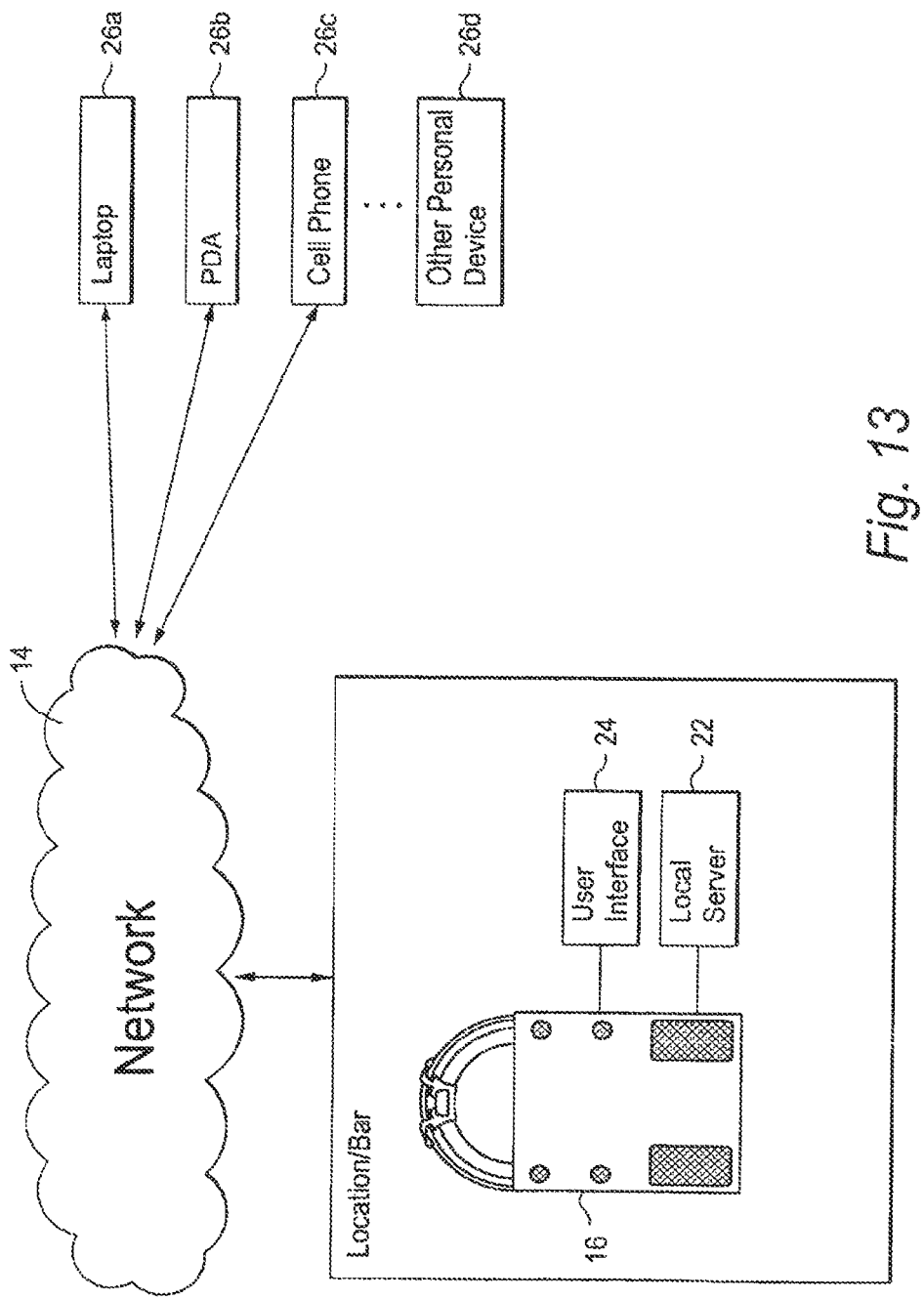
FIG. 13 is a block diagram of an improved downloading digital jukebox system with remote devices outside of a particular location accessing the digital jukebox system.

FIG. 13 is a block diagram of an improved downloading digital jukebox system with remote devices outside of a particular location accessing the digital jukebox system. In this exemplary embodiment, jukebox 16 with local server 22 and user interface 24 is connected to a network 14. Unlike remote devices 26a-26c which connect directly with jukebox 16 in FIG. 12, these remote devices 26a-26c also are connected to network 14. Thus, users may login to jukebox 16 over a potentially broad area. For example, remote devices 26a-26c may connect with jukebox 16 over LAN, WAN, Internet connection, or the like. User profile information may be stored on local server 22. Again, a change made by a remote device (e.g., to user profile information, playlist contents, purchased media, etc.) would be mirrored on jukebox 16, any other associated remote devices, and/or on other jukeboxes, etc.

Figure 14:
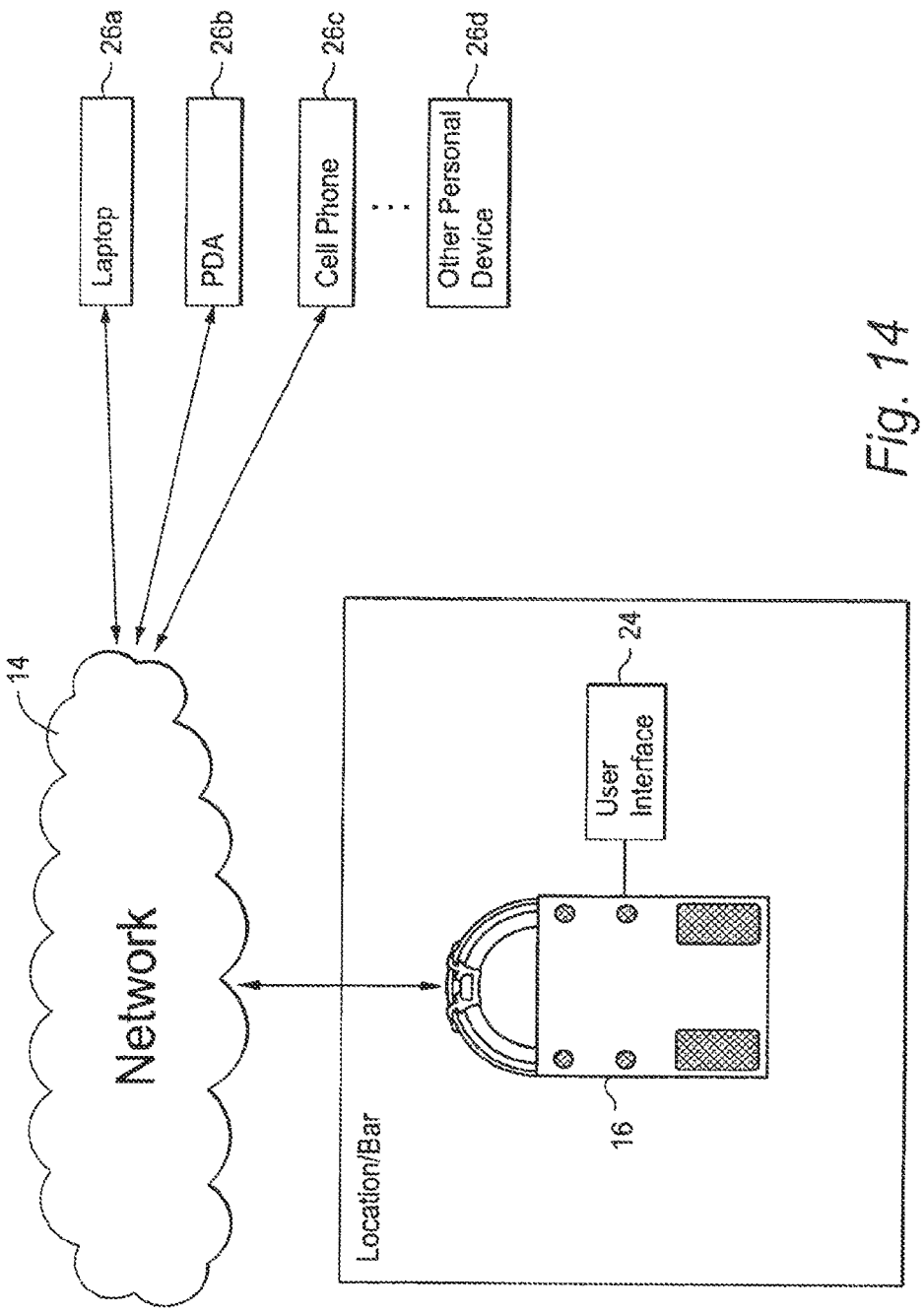
FIG. 14 is another block diagram of an improved downloading digital jukebox system with remote devices outside of a particular location accessing the digital jukebox system.

FIG. 14 is another block diagram of an improved downloading digital jukebox system with remote devices outside of a particular location accessing the digital jukebox system. FIG. 14 is like FIG. 13, in that a plurality of remote devices 26a-26c are connected to jukebox 16 over network 14. However, FIG. 14 includes a database 29 connected to network 14. Database 29 may store, for example, user profile information, users' playlist definitions, etc. This configuration may be advantageous in some exemplary implementations because a plurality of jukeboxes connected to network 14 may all access the central database 29 without contacting individual jukeboxes or individual remote devices, which may not always be available.

Figure 15:
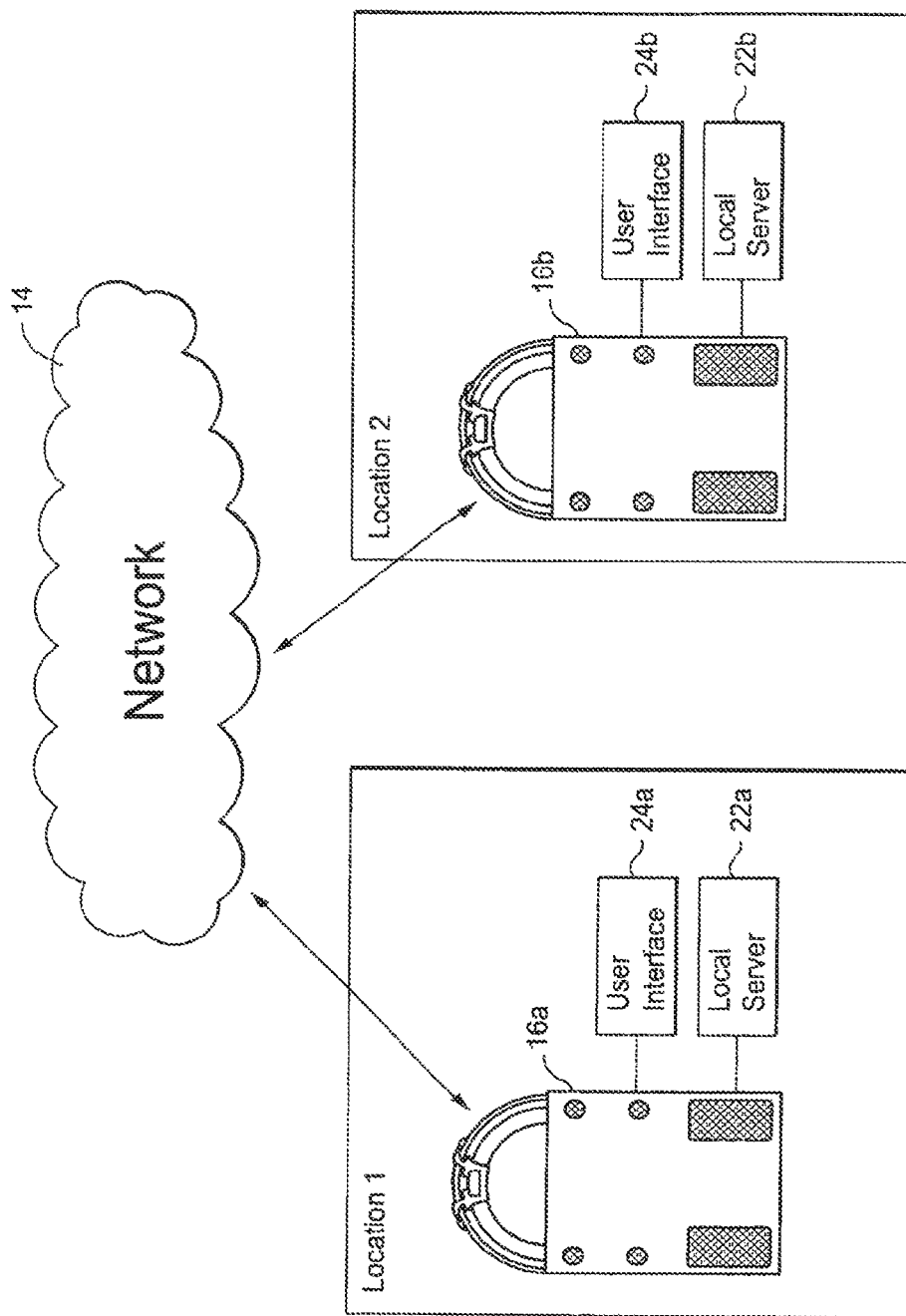
FIG. 15 is a block diagram of an improved downloading digital jukebox system with another downloading digital jukebox system outside of a particular location accessing the first digital jukebox system.

FIG. 15 is a block diagram of an improved downloading digital jukebox system with another downloading digital jukebox system outside of a particular location accessing the first digital jukebox system. In this exemplary embodiment, a jukebox 16a with a local server 22a and a user interface 24a are located within a first location, and a jukebox 16b with a local server 22b and a user interface 24b are located within a second location. It will be appreciated that the locations may be different rooms within a single bar, two separate establishments, etc. Both jukebox 16a and jukebox 16b are connected via network 14. User profile information may be stored at one or both of local server 22a and 22b. In some exemplary embodiments, if user profile information is stored on only one local server, a user logging-in to one jukebox would be able to access information stored on the other local server. In other exemplary embodiments, if user profile information is stored on both local servers, any changes made on one jukebox would be mirrored on the other. In still other exemplary embodiments, user profile information may be retrieved from a first jukebox and stored to a second jukebox only when a user accessed the second jukebox. These configuration are advantageous because they do not distribute user information to areas where users do not access their information. For example, a user who travels from Washington to Los Angeles on business would be able to access that user's particular information created in Washington by logging-in to a jukebox in Los Angeles; however, because that hypothetical user has not logged-in to a jukebox in Montreal, jukeboxes there would not necessarily have the user's information stored locally.

Figure 16:
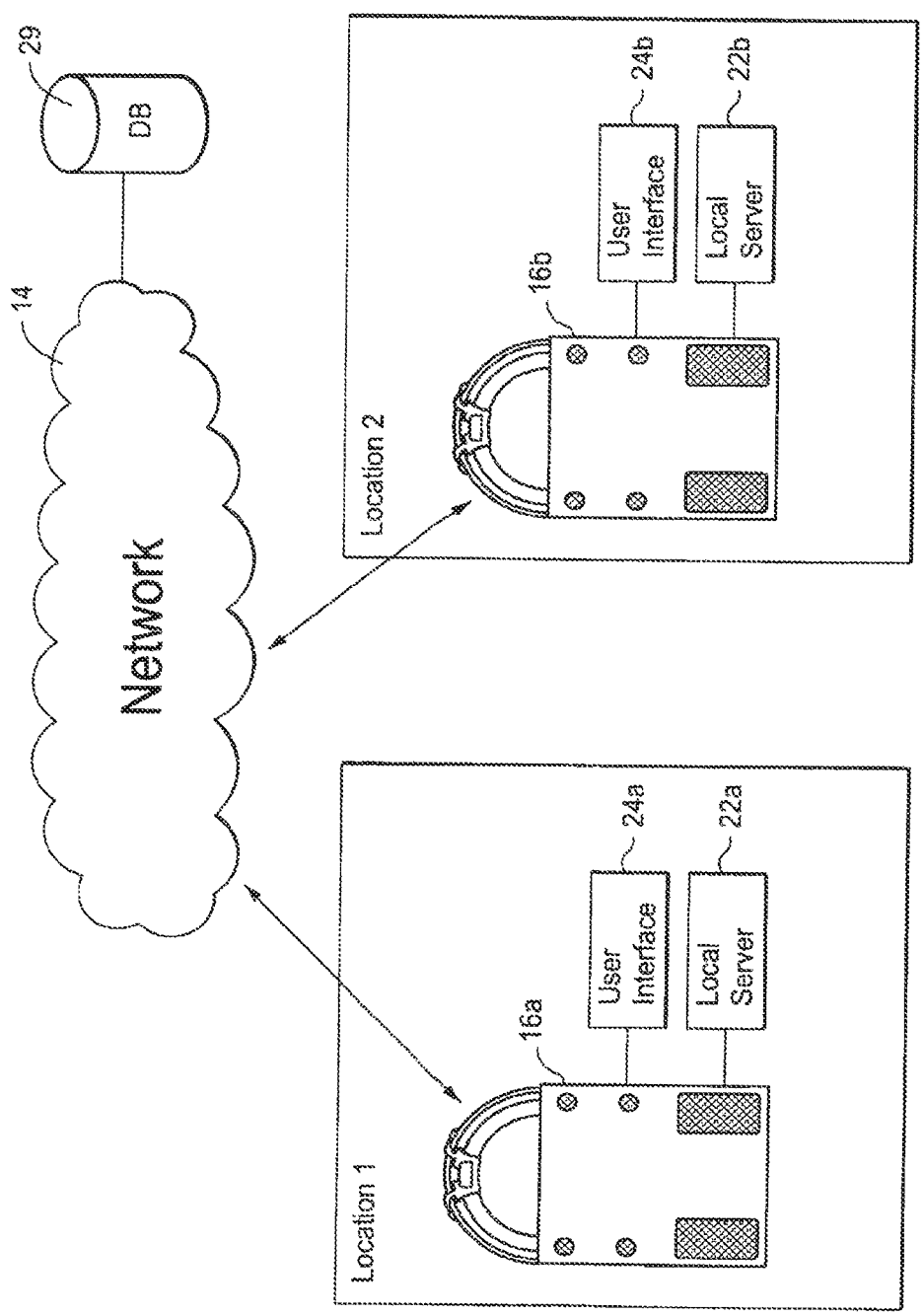
FIG. 16 is another block diagram of an improved downloading digital jukebox system with another downloading digital jukebox system outside of a particular location accessing the first digital jukebox system.

FIG. 16 is another block diagram of an improved downloading digital jukebox system with another downloading digital jukebox system outside of a particular location accessing the first digital jukebox system. FIG. 16 is like FIG. 15, in that a jukebox 16a is connected to a jukebox 16b over network 14. However, FIG. 16 includes a database 29 connected to network 14. Database 29 may store, for example, user profile information, users' playlist definitions, etc. This configuration may be advantageous in some exemplary implementations because a plurality of jukeboxes connected to network 14 may all access the central database 29 without contacting individual jukeboxes or individual remote devices, which may not always be available. It will be appreciated that a plurality of jukeboxes may be attached through network 14.

Exemplary Music Recommendation Engine Feature

As noted above, it would be desirable to provide innovative techniques for both increasing per-jukebox revenue while also keeping jukebox patrons engaged with the jukebox, as there is a correlation between keeping jukebox patrons engaged by providing new and interesting services and maintaining a healthy jukebox operating model. To this end, in certain exemplary embodiments, a patron may be encouraged to play more songs when in front of the jukebox, e.g., via the use of a recommendation engine that makes song recommendations to the jukebox user. In certain exemplary embodiments, the recommendations may be made before, during, and/or after the user has made a paid music selection, therefore encouraging the user to insert more funds (e.g., coinage or other credits) and queue up more songs for play.

Target customers for the recommendation engine of certain exemplary embodiments may be all jukebox users. On the other hand, certain exemplary embodiments, however, may target the recommendation engine to only a subset of users such as, for example, registered users, users who use the jukebox during certain times of the day or days of the week, etc.

The song recommendations may be available directly from the music catalogue stored on the jukebox, e.g., from the country catalogue to which the jukebox is associated, in certain exemplary embodiments. In such exemplary embodiments, songs that are not on the jukebox and thus must be downloaded would not be recommended, as the user should have their recommended song immediately available. However, in certain other exemplary embodiments, songs available from the local server may be recommend and, in still other exemplary embodiments, any song available via the jukebox network may be recommended. It will be appreciated that a the normal amount of credits or an increased number of credits may be charged to play a recommended song in certain exemplary embodiments. In certain other exemplary embodiments, a normal number of credits may be charged for songs available directly from the jukebox, a first increased number of credits may be charged for songs available from the local server, and a second increased number of credits greater than the first increased number of credits may be charged for songs that need to be downloaded before they can be played. It will be appreciated that other pricing schemes may be used in connection with certain other exemplary embodiments.

It is assumed that displaying song recommendations based on the song or songs that a user has selected will result in the user inserting more coinage in order to play the recommended song(s). This recommendation feature of certain exemplary embodiments may be done somewhat transparently, e.g., without interrupting the user's experience in front of the jukebox. Furthermore, the recommendation system of certain exemplary embodiments may give accurate and precise results, even for a wide variety of selections.

In certain exemplary embodiments, once a user has selected a song and/or credits are almost depleted (e.g., the credits fall below a certain percentage of the total number of credits inserted or the credits fall below an absolute number), song recommendations may be made, e.g., based at least in part on the last song selected or the last several songs selected. Selectively enabling the song recommendation feature when the credits are almost depleted may help to extend the user's experience in front of the jukebox and/or to reduce the chances of a user's experience being cut shorter than it otherwise could be. This sort of processing also helps to improve the amount of revenue that may be obtained from individual patrons. The number of credits remaining when the song recommendation feature is displayed may vary in certain exemplary embodiments. For example, it may be higher or lower depending on the type of user, time of day or day of week, etc. As noted above, the songs may or may not be available for immediate playback in certain exemplary embodiments, and/or the recommended song(s) may be made available at various price levels.

Additionally, the recommended song(s) may be popular, and the popularity of the songs available for playback therefore may be taken into account in making recommendations, e.g., using the catalogue by country. The popularity of the song may be judged based on a particular location, a particular geographic region, on the entire jukebox network plays, on external objective measures (e.g., Billboard rankings, new album sales, radio plays, etc.), and/or the like. Furthermore, it has been discovered that patrons generally will not spend as much money discovering new songs as compared to playing a song (or an artist) that they have some familiarity with (e.g., have heard before, have heard of, etc.). Accordingly, the plays for a particular jukebox, the objective indicators noted above for a certain geographic region, the playlists of registered users, etc., may be weighted more heavily when recommending songs.

In certain exemplary embodiments, during the paid song selection process, when the user has not reached the point where the recommendation feature (e.g., a "Music Recommender") has been automatically activated (e.g., without direct user control), the user may be allowed to select a button (e.g., by touching an area of a touch screen display) or in some other way cause recommendations to be displayed based on their last selection or last selections. The button may be visible and, if the user does not select the button, the user may proceed in the song selection process without having their jukebox experience disturbed.

In certain exemplary embodiments, a button or other display feature indicative of the Music Recommender may be shown, e.g., and also may encourage the user to create a playlist within the remotely accessible (e.g., web-based) system described above. For example, a message such as, "We can enhance your recommendations if you let us know the type of songs you listen to!" may be displayed, thereby providing an explicitly approved form of data collection that helps to determine a user's preferences. If such a selection is made, the user may be directed to the appropriate section to become a registered user and/or to create a playlist. The remotely accessible website also may be mentioned as a means of creating playlists, thereby encouraging users to visit it and use jukebox-related features remotely (e.g., reducing crowding at the jukebox itself). After a user becomes a registered user (for example, identifying music preferences generally and/or specifically) and/or creates a playlist, recommendations may be more precisely made, e.g., based on the user's explicitly provided musical preferences. In certain exemplary embodiments, this feature may be displayed after a user has played a recommended song, since the user may then be identified as someone that enjoys the interactive process of the jukebox. There also may be an explicit (e.g., active) data collection process, as implicit (e.g., inactive) data collection does not necessarily rely on the direct input of a user's opinion but is instead (or in addition) implied by a user's actions. This process does not always accurately represent the user's true opinion when compared to explicit data collection.

As a part of an explicit data collection process, the recommendation process may be tailored for a user by asking questions, collecting data, and then making recommendations for the user. This process may be done in certain exemplary embodiments when a user is defined as an active user (e.g., a user who has just inserted above average coinage), although it may be done in certain other exemplary embodiments for all users, only registered users, randomly, etc. Having a criteria such as one of the above may help to avoid the jukebox from being blocked by users customizing their recommendations without inserting any or additional money. Questions may be used to narrow the genre, style, listening preferences, etc., the user has to help determine ideal song recommendations.

In general, it has been observed that there are, on average, 2.3 users in front of a jukebox when a song selection is made. Thus, the criteria for recommending a song in certain exemplary embodiments may include searching for patterns of music selection, and then narrowing the field of songs by filtering by style and genre. Grouping of styles may be made in certain exemplary embodiments, in addition or in the alternative, so that styles that fit together are linked. In these and/or other ways, filters may be generated and/or applied to recommendations. For example, a filtering process may be applied with respect to era or generation of the songs.

Also, in certain exemplary embodiments, a series of links may be made for certain artists and bands. For example, the following links may be made:
TABLE-US-00001 Artist Recommendation Link The Police Sting Pink Floyd Roger Waters Genesis Peter Gabriel Phil Collins These links may be made to work in reverse, as well. The links may be established manually (e.g., by a human), or may be created entirely or in part by a computerized process. For example, a computerized process may search for and establish linkages between members of bands who have "gone solo" (e.g., Fergie and the Black Eyed Peas, Justin Timberlake and N'Sync, etc.), bands that have changed their names (e.g., Jefferson Airplane to Jefferson Starship, etc.), for bands and their different members (e.g., the Doobie Brothers, Michael McDonald, Tom Johnston, and Bobby LaKind), between singers and songwriters (e.g., Johnny Cash and Kris Kristofferson), and so forth.

The lifecycle of an exemplary music recommendation engine feature, and how it may being used on a jukebox in accordance with an exemplary embodiment, will now be described. As alluded to above, the exemplary music recommendation engine feature may help improve the revenue generated by the jukebox, e.g., by offering patrons musical recommendations that match their musical tastes.

Figure 17:
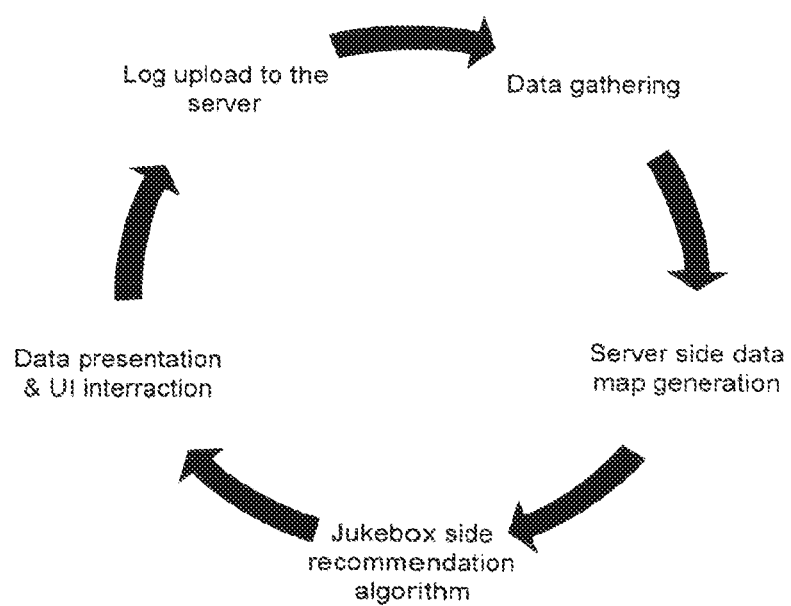
FIG. 17 is an illustrative data flow of the music recommendation engine in accordance with an exemplary embodiment.

FIG. 17 is an illustrative data flow of the music recommendation engine in accordance with an exemplary embodiment. In an illustrative data gathering and session processing step, information relevant in recommending music is gathered. The source of the information includes log files that are uploaded daily by jukeboxes to the central servers to report the plays that occurred on the respective jukeboxes. These files are processed, and the different plays are aggregated to let play patterns emerge from the mass of data.

In an illustrative server side data map generation step, play patterns are compiled to form a data map where the different elements are linked with each other. Each link possesses a weight conveying the strength of the link between two elements. This data map may be post processed and altered to suit the needs of the client side recommendation system. These modifications and optimizations may include operations such as re-weighting of rankings (e.g., the rankings need not be ordinal in nature, may vary depending, for example, on time of day, number of songs chosen at a time, whether the user was a registered and/or logged in user, etc.), alternative ranking methods, addition of explicit linking rules (e.g., to filter out inappropriate songs based on, for example, venue type, explicit content restrictions, etc.), and/or the like. The output of this process includes a data map that may be accessible by (e.g., sent to) jukeboxes units to fuel client side music recommendation engines. The data map of certain exemplary embodiments may be one or more files. In certain exemplary embodiments, the data map may be stored as any suitable data structure including, for example, as a directed or undirected graph, table, list, etc.

In an illustrative jukebox side recommendation algorithm step, following the accessing (e.g., reception and installation) of the matrix file, the jukebox side implementation of the recommendation engine may take the received data as an input to a system that has a number of different parameters. The raw recommendation output offered by the data map may be used as a base for the recommendations. Alternatively, the raw recommendation output may be further influenced by situation specific factors such as, for example, music files metadata, local behavior of the jukebox, the play habits of the complete jukebox network, the play habits of the location, the play habits of the logged in users, feedback of past recommendations, etc.

In an illustrative data presentation to the user step, these choices may present themselves via the user interface, e.g., on explicit invocation of the feature or implicitly. In the later case, an implicit invocation may be a consequence of events on the jukebox such as, for example, particular songs being selected, running low on credits (e.g., when the number of credits deposited by a particular user reaches a certain percentage or absolute number), when music in the queue falls below a certain level (e.g., below a certain percentage full or absolute number), etc. When either the explicit or implicit invocation technique is activated, certain exemplary embodiments may then proactively recommend music selections to the end user.

In an illustrative feedback step, the songs that were played and/or detailed usage of the recommendation engine may be logged and uploaded to the server. For example, such information may include the number of recommendations selected, which recommendations were selected and/or which recommendations were not selected, how many and/or which recommendations were selected if multiple recommendations were made in a row, etc. General jukebox usage may be processed locally to directly feed the jukebox recommendation engine, thereby helping to ensure the best recommendations possible, at least at the local level. Log files may be made accessible (e.g., uploaded) to the central server to allow for the regeneration of an updated data match map.

Exemplary Staff Member Loyalty Features

Another way of providing innovative techniques for both increasing per-jukebox revenue while also keeping jukebox patrons engaged with the jukebox involves, in certain exemplary embodiments, augmenting jukebox music revenue by implementing a relationship between the jukebox and the location staff members.

To this end, certain exemplary embodiments may provide a loyalty program for barmaids/bartenders and location staff that will drive more paid plays on jukeboxes. As described in greater detail below, in such exemplary embodiments, the incentive for the barmaid/bartender/staff may involve earning points and redeeming them for prizes, participation in random drawings for prizes (e.g., such as one draw entry for every login), etc. Points may be accumulated when barmaid(s)/bartender(s) are logged in and coinage is inserted into the jukebox. The target customer in certain exemplary embodiments may be all barmaids, bartenders, and/or staff employed at jukebox locations. That is, location staff members may be targeted as an audience for specific features via the loyalty program.

The loyalty program may run continuously during the day and/or night in certain exemplary embodiments. However, the loyalty program may be restricted to certain dates and/or times (e.g., non-peak hours) in certain exemplary embodiments.

The jukebox target audience has traditionally been the bar patrons. This feature of certain exemplary embodiments marks a shift toward designing features oriented at the location staff members. A focus of this feature is to give the bar staff a way to identify themselves and let the jukebox know who they are to, in turn, have access to location staff member specific features. This comes with recognition that staff members are always on-location; therefore, using them to drive paid plays may provide an overall benefit to the jukebox providers, operators, and end-users. Indeed, if staff members already insert money into the jukebox, they may be tempted to insert more money via the loyalty program. Furthermore, staff members may be able to drive patrons to insert more coinage in order for them to accumulate points.

In this regard, in certain exemplary embodiments, a login system may be provided for location staff members. A fully featured account system thus may target location staff members for these accounts, e.g., in order to start offering personalized features. Such an account may contain personal information (e.g., name or nickname, contact information, shift information, etc.), personalized media such as photos and avatars, and feature-specific information for each user. Access to user accounts may be available via a jukebox at a location and/or remotely (e.g., via a remotely accessible website or the like).

A bartender loyalty program feature may be provided in certain exemplary embodiments and thus may be designed to offer an incentive to the bar staff to log in and encourage jukebox plays. For example, registered staff may be offered access to prizes, e.g., through the accumulation of loyalty points. Points may be earned in certain exemplary embodiments through usage of the jukebox by jukebox patrons and then transferred to location staff members. In certain exemplary embodiments, instead of or in addition to points, drawings, giveaways, etc., may be offered to registered staff. For example, the more a staff member encourages plays, the more entries in a raffle the staff member may be automatically afforded. Additional details and examples are provided below.

The bar staff will be given a way to log in the jukebox, and stay logged in throughout their shift. The exact login methods may be communicated and advertised on the jukebox at the specific times when the staff member is directly interacting with the jukebox. For example, login methods may be "advertised" to staff members at the start or end of their shifts, during setup or cleanup of a bar (e.g., before or after customers have entered or left the location), etc.

Once logged in, a staff member may be presented with specific information concerning the features to which the staff member has access. For example, in the case of bartender loyalty, current account status may be displayed (e.g., active vs. inactive, number of points, comparative ranking to other staff members in the location or among a group of locations, etc.). In certain exemplary embodiments, more than one staff member may be logged in at the same time.

As alluded to above, points may be earned as part of a bartender loyalty program. The loyalty program may offer an incentive to the bar staff to log in by offering the possibility to earn points based on certain conditions such as, for example, the general usage of the jukebox during the logged-in period. As the jukebox is used, points may be accumulated following a specific built-in logic (e.g., X points for Y plays, A points for B different users using the jukebox, etc.).

In addition, certain exemplary embodiments may provide a suite of patron-oriented features as a part of the bartender loyalty program. Features targeting the jukebox patron may be derived from a situation where more than one staff member is logged in at the same time, for example. Jukebox patron targeted features may include, for example, letting the jukebox patron select which logged in staff member should be awarded points, etc. Thus, the patron may help ensure that points are allotted to the proper staff member. Similarly, patrons also may help indicate which staff members are their favorites, etc.

Location staff member accounts may be synchronized with a central server to help ensure consistency and proper tracking of users in certain exemplary embodiments. Synchronization also may be advantageous, as some staff members may work at multiple locations. Statistics may be collected and cross-linked to locations to monitor patterns and play increases. Adjustments to the bartender loyalty program may be made, if deemed necessary. For example, more loyalty points may be provided if staff members are not responding to current levels, better or more prizes may be given out, etc. Log files of the above information may be generated and stored locally and/or on the central server, e.g., as individual files, in a database, etc.

The bartender loyalty program may offer prize giveaways based on certain criteria. A mechanism to manage user points to allow for participation in contests, sweepstakes, and/or conversion of points to merchandises or services also may be provided. In certain exemplary embodiments, a catalog may be provided through which staff members may trade in points for prizes or awards. In certain exemplary embodiments, staff members may be entered into contests such as, for example, giveaways, raffles, or the like. In certain exemplary embodiments, points may be traded in for entries into such contests. It will be appreciated that other point and/or reward systems also are possible in addition to, or in place of, the above-noted systems.

Figure 18:
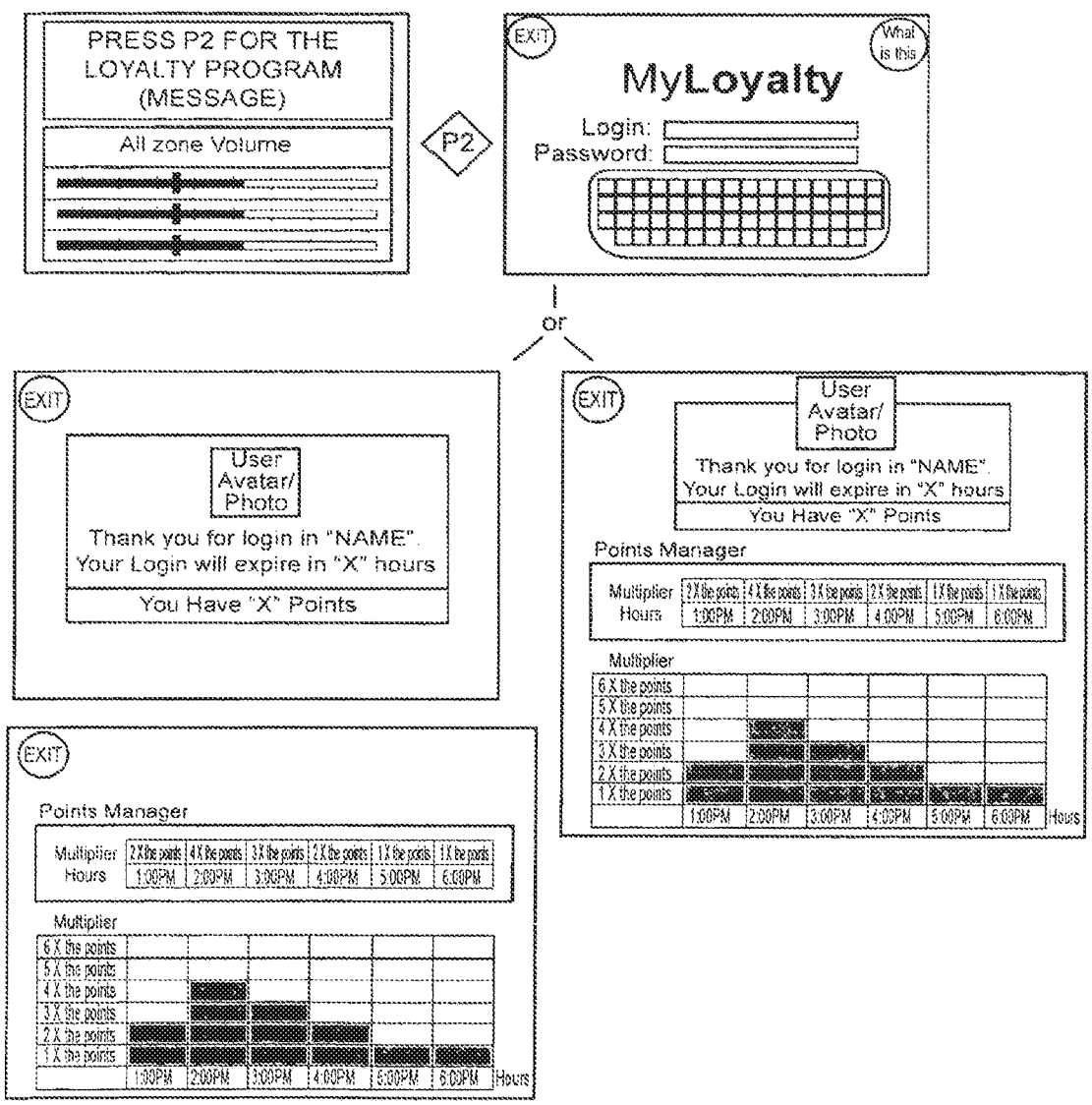
FIG. 18 shows a series of illustrative screenshots accessible by staff members for use with a staff member loyalty reward program according to an exemplary embodiment.
Figure 19:
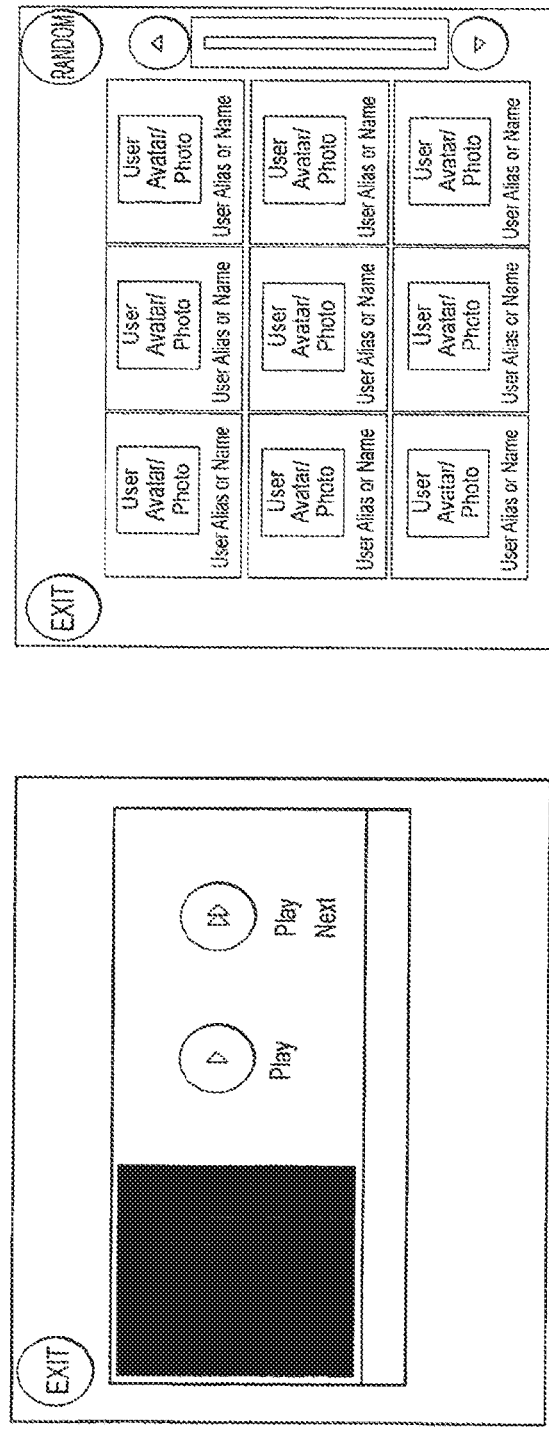
FIG. 19 shows two illustrative screenshots accessible by jukebox patrons for use with a staff member loyalty reward program according to an exemplary embodiment.
Figure 20:
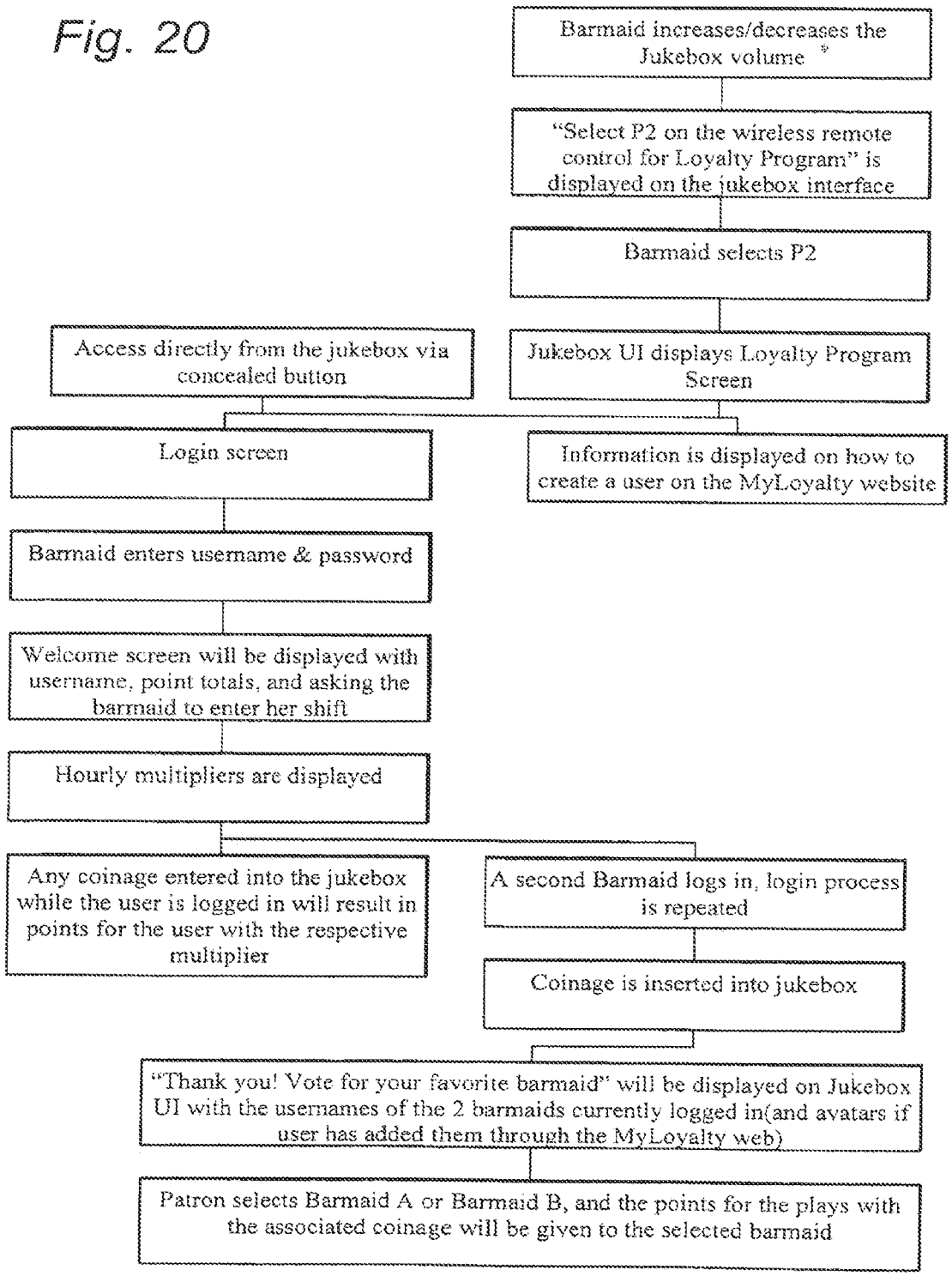
FIG. 20 is a flowchart showing an illustrative process in which a staff member may participate in a loyalty reward program according to an exemplary embodiment.

A more detailed description of the above-described staff member loyalty features of certain exemplary embodiments will now be provided. They also are shown visually, for example, in FIGS. 18-20. More particularly, FIG. 18 shows a series of illustrative screenshots accessible by staff members for use with a staff member loyalty reward program according to an exemplary embodiment; FIG. 19 shows two illustrative screenshots accessible by jukebox patrons for use with a staff member loyalty reward program according to an exemplary embodiment; and FIG. 20 is a flowchart showing an illustrative process in which a staff member may participate in a loyalty reward program according to an exemplary embodiment.

When an employee uses the wireless remote to adjust the jukebox volume, a message along the following lines may appear on the screen: "Select P2 on the wireless remote to access the Loyalty Program." When P2 or other similar button is selected, a screen may be displayed with the two following options: "LOGIN/LEARN MORE ABOUT THE LOYALTY PROGRAM-VISIT www.mytouchtunes/my-Loyalty.com." There also may be instructions displayed on the screen detailing how to login.

When a staff member visits the MyLoyalty website, the staff member may be asked to create an account with some or all of the following illustrative information: username and password, full name, street address, city, state/province, zip Code/postal Code, email address, avatar upload (optional), location, etc. Rules and regulations may be displayed when the form is completed, and the staff member may be required to click to accept the terms. There can be multiple players per location, but certain exemplary embodiments may impose a limit of only one player account being created per employee name and/or email address. Operators may distribute information about the loyalty program, prompting staff members to participate in it.

In other words, a loyalty website may be created where staff members are be able to create accounts. Such a website also may allow points to be redeemed for rewards, e.g., after allowing for available prizes and rewards, player ranking at the location (e.g., in comparison to other locations or other staff members, etc.), and/or other link information is viewed.

The first time staff members login to the "MyLoyalty" website, they may be prompted to create an account, e.g., specifying the information above. Accumulated points and objectives may also be displayed via the MyLoyalty website once a staff member has logged in. In this regard, "objectives" may include encouraging a certain number of plays within a time period or overall (e.g., X plays in an hour, Y plays per day, Z total plays, etc.), being voted the most popular bartender at a bar, etc.

If a prize is "purchased," the appropriate number of points may be deducted from the staff member's point total, and the new amount of available points may be displayed. The new point information may be updated throughout the system, e.g., by sending an appropriate message to a database on the central server and/or to the appropriate jukebox(es).

Similarly, a staff member may be able to access a login section via the jukebox itself using the P2 or other button on a remote control, or via a dedicated button or switch. In the later case, the button or switch may be concealed on the jukebox to reduce the likelihood of location patrons accessing the feature when they should not. The button or switch may be a physical button or switch or a "soft" button or switch accessible via the user interface of the jukebox (e.g., by pressing an otherwise innocuous-appearing location, series of locations or selections, etc.). The means for finding this button or switch may be described in leaflets distributed by operators, etc.

Once a staff member has triggered the login screen, the staff member may login in using a username and password, which may have been created on the website, on the jukebox, or provided for the staff member. The username and password may be validated by verifying the information on a central database. A welcome screen may appear asking the employee to enter shift information. Point totals to-date also may be displayed. The staff member may view the potential point multiples that can be gained during the hourly shifts. For example, something like the following illustrative table that lists hours and points multipliers may be displayed: TABLE-US-00002 Upcoming Hours Points Multiplier 1:00 PM-2:00 PM 3.times. the points 2:00 PM-3:00 PM 4.times. the points 3:00 PM-4:00 PM 3.times. the points 4:00 PM-5:00 PM 2.times. the points The staff member may receive a predetermined number of points for each song play (e.g., 1), multiplied by the points multiplier. The points multiplier may be defined on the following basis in certain exemplary embodiments: higher multipliers during non-peak hours, lower multipliers during peak hours. Multiplier rules may be specified centrally, e.g., on the central server, and the totals may be calculated centrally on a per-jukebox basis, e.g., for hourly or other timeframes, and/or may be calculated locally and then uploaded to a central database. Of course, it will be appreciated that various other schemes may be used that may be different from those listed above.

A timeout function may be implemented in connection with the above-mentioned screens. For example, if the screen is not touched or input is not otherwise made in a predetermined amount of time (e.g., 5 seconds, 10 seconds, etc.), then the regular user interface may be displayed.

Any coinage entered after login and selected paid plays using the normal interface may be logged. For example, song ID, time, PIN, jukebox, barmaid/bartender logged in, etc., may be logged. The logged information may be sent to the central server, e.g., for accounting, loyalty reward, and/or other purposes.

The jukebox may remain in the mode of the logged in player until the employee's shift has ended, e.g., as pre-programmed by the staff member or proprietor, or until the staff member or other authorized user has indicated that the shift is over.

Multiple staff members may log in at the same time in certain exemplary embodiments. In certain exemplary embodiments, when a second staff member logs in, the interface may display other staff members already logged in. A staff member may bump out another staff member if the other staff member is logged in but not currently working, in certain exemplary embodiments.

When there are multiple staff members currently logged in and credits are inserted, a screen may be displayed via jukebox, which may enable the user to indicate which staff member encouraged the play. For example, the message may state, "Thank you. Who is your favorite bartender?," and the avatars and/or usernames of location staff currently logged in may be displayed along with the message. The selected staff member may have the points for the inserted coinage credited to the appropriate account.

Optionally, the staff members' avatars and/or names (e.g., which may have been provided during or subsequent to account creation) may be inserted into the jukebox's "attract mode" loop. If a staff member has not logged in for more than a predetermined number of days (e.g., more than 7 days, more than 10 days, etc) or if they have been removed by an authorized user (e.g., the proprietor of the location, an operator, etc.), then their avatar may be removed from the attract loop. Avatar validation may be performed, e.g., to help ensure that the avatars meet decency requirements of the location.

In certain exemplary embodiments, the loyalty program may be implemented for certain geographic regions (e.g., the entire multi-country jukebox system, an entire country, a group of states, a single state, etc.). In certain exemplary embodiments, the rewards given out may be tailored to the particular area in which the program is being run.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A method of implementing a staff member loyalty program on a digital jukebox device provided at an out-of-home location, the method comprising:
   storing, in a digital memory coupled to a processor of the digital jukebox device, (1) at least one condition under which staff members are to be provided with points in connection with the loyalty program, a number of points being associated with each said condition, and, (2) at least one individual staff member-specific feature for the out-of-home location;

providing a user interface on a display of the digital jukebox device for at least one staff member to login to the loyalty program via the digital jukebox device;

upon login by the at least one staff member via the user interface, keeping the at least one staff member logged in to the digital jukebox device for a predetermined duration configured in accordance the at least one location staff member-specific feature and determining, by the processor, a number of different users using the digital jukebox device for paid playback of songs while the at least one staff member is logged in to the digital jukebox device; and upon each occurrence of the at least one condition while the at least one staff member is logged in to the digital jukebox device as determined by the processor, providing, by the processor, the number of points associated with the relevant condition to the at least one staff member, wherein said each occurrence is detected by the processor of the digital jukebox device, and wherein an accumulated said number of points is changed in the digital memory by the processor in accordance with the determined number of different users.

2. The method of claim 1, further comprising providing a plurality of conditions.

3. The method of claim 2, wherein one said condition corresponds to X points being awarded for Y plays on the digital jukebox device during a predefined time period.

4. The method of claim 3, wherein the X points are multiplied by a multiplier based on time of day and/or day of week.

5. The method of claim 2, wherein one said condition corresponds to A points being awarded for B different users using the digital jukebox device during a predefined time period.

6. The method of claim 1, further comprising synchronizing staff member accounts with a central database located remote from the digital jukebox device.

7. The method of claim 1, further comprising displaying, via the digital jukebox device, a number of points earned by the staff member upon the staff member logging in to the loyalty program.

8. The method of claim 1, further comprising receiving input from a user indicating the staff member to which points are to be awarded.

9. The method of claim 1, further comprising: receiving votes from a plurality of digital jukebox device users indicating a preferred staff member; and providing points to the preferred staff member.

10. The method of claim 1, further comprising providing the staff member with a prize in exchange for a predetermined number of points, the predetermined number of points being deducted from an account of the staff member.

11. A digital jukebox device provided at an out-of-home location, comprising:

a user interface displayed on the display of the digital jukebox device configured to enable at least one staff member to login to a staff member loyalty program system via the digital jukebox device, the loyalty program system defining (1) at least one condition under which staff members are to be provided with points in connection with the loyalty program, a number of points being associated with each said condition and the at least one condition including inserting coinage in the digital jukebox device, and (2) at least one individual staff member-specific feature for the out-of-home location;

and a processor configured to upon login by an at least one staff member, keeping the at least one staff member logged in for a predetermined duration configured in accordance with the out-of-home location and the at least one individual staff member-specific feature and determining, by the processor, a number of different users using the digital jukebox device for paid playback of songs, while the at least one staff member is logged in to the digital jukebox device;

wherein upon each occurrence of the at least one condition while the at least one staff member is logged in to the digital jukebox device, the digital jukebox device is configured to provide the number of points associated with the relevant condition to the at least one staff member and update the loyalty program system accordingly, wherein said each occurrence is detected by the processor of the digital jukebox device, and wherein an accumulated said number of points is changed by the processor in accordance with the determined number of different users.

12. The digital jukebox device of claim 11, wherein a plurality of conditions are defined by the loyalty program system.

13. The digital jukebox device of claim 12, wherein one said condition corresponds to X points being awarded for Y plays on the digital jukebox device during a predefined time period.

14. The digital jukebox device of claim 13, wherein the X points are multiplied by a multiplier based on time of day and/or day of week.

15. The digital jukebox device of claim 12, wherein one said condition corresponds to A points being awarded for B different users using the digital jukebox device during a predefined time period.

16. The digital jukebox device of claim 11, wherein the digital jukebox device is further configured to synchronize staff member accounts with a central database located remote from the digital jukebox device.

17. The digital jukebox device of claim 11, wherein the user interface is further configured to receive input from a user indicating the staff member to which points are to be awarded.

18. The digital jukebox device of claim 11, wherein the user interface is further configured to receive votes from a plurality of digital jukebox device users indicating a preferred staff member, and wherein the digital jukebox device is configured to provide points to the preferred staff member.

19. The digital jukebox device of claim 11, wherein the digital jukebox device is configured to provide the staff member with a prize in exchange for a predetermined number of points, the predetermined number of points being deducted from an account of the staff member.

20. The digital jukebox device of claim 11, wherein the user interface is configured to display a number of points earned by the staff member upon the staff member logging in to the loyalty program system.

* * * * *